(12) United States Patent
Oliver

(10) Patent No.: US 11,073,419 B2
(45) Date of Patent: Jul. 27, 2021

(54) APPARATUS INCLUDING A BRACKET CONNECTOR FOR DETERMINING THE WEIGHT OF AN OBJECT SUCH AS A SHIPPING CONTAINER

(71) Applicant: CONWEIGH INNOVATION PTY LTD, Brisbane (AU)

(72) Inventor: James Thomas Oliver, Ascot (AU)

(73) Assignee: CONWEIGH INNOVATION PTY LTD, Northgate (AU)

( * ) Notice: Subject to any disclaimer, the term of this patent is extended or adjusted under 35 U.S.C. 154(b) by 142 days.

(21) Appl. No.: 15/773,885

(22) PCT Filed: Nov. 4, 2016

(86) PCT No.: PCT/AU2016/051053
§ 371 (c)(1),
(2) Date: May 4, 2018

(87) PCT Pub. No.: WO2017/075667
PCT Pub. Date: May 11, 2017

(65) Prior Publication Data
US 2018/0340818 A1    Nov. 29, 2018

(30) Foreign Application Priority Data

Nov. 6, 2015 (AU) ................................ 2015904570
Jan. 20, 2016 (AU) ................................ 2016200333
(Continued)

(51) Int. Cl.
*G01G 19/18*    (2006.01)
*G01G 19/14*    (2006.01)

(52) U.S. Cl.
CPC ............. *G01G 19/18* (2013.01); *G01G 19/14* (2013.01)

(58) Field of Classification Search
CPC .............................. G01G 19/14; G01G 19/18
See application file for complete search history.

(56) References Cited

U.S. PATENT DOCUMENTS 3,517,761 A * 6/1970 Wigman .................. B66C 1/40
                                                        177/147
3,911,737 A    10/1975 Ormond
(Continued)

FOREIGN PATENT DOCUMENTS

GB          2140570 A       11/1984
GB          2229823 B        2/1993
WO    WO 2015/026246 A2     2/2015

*Primary Examiner* — Natalie Huls
(74) *Attorney, Agent, or Firm* — Blank Rome LLP

(57) ABSTRACT

A method and system for determining the weight of an object, such as a shipping container, comprises a plurality of portable weighing units. The weighing units are attachable to the ISO corner connectors of the shipping container. The shipping container is lifted and its weight is then supported by the portable weighing units. The portable weighing units are arranged such that the load applied by the weight of the shipping container passes through respective load cells in each weighing unit in the required direction of loading to ensure an accurate reading from each load cell. The system also includes software enabling a customer to book a weighing service and software to facilitate weighing of the shipping container and transmitting weight data for the shipping container to the customer or to a third party.

19 Claims, 21 Drawing Sheets

(30) Foreign Application Priority Data

| | | |
|---|---|---|
| Feb. 16, 2016 | (AU) | 2016900534 |
| Jul. 1, 2016 | (AU) | 2016902595 |
| Oct. 5, 2016 | (AU) | 2016904043 |

(56) References Cited

U.S. PATENT DOCUMENTS

| | | | |
|---|---|---|---|
| 4,420,052 A | | 12/1983 | Hale |
| 4,503,921 A | | 3/1985 | Polen et al. |
| 5,545,855 A | | 8/1996 | Stanfield et al. |
| 5,861,581 A | * | 1/1999 | Evans .................... G01G 19/08 177/136 |
| 7,040,178 B1 | * | 5/2006 | Perkins ................ G01G 23/005 73/856 |
| 7,645,949 B1 | | 1/2010 | Thompson |
| 2004/0238230 A1 | * | 12/2004 | Petrotto ................. G01G 19/18 177/144 |
| 2005/0001731 A1 | * | 1/2005 | Senoo ............... B60R 21/01516 340/666 |
| 2006/0059814 A1 | * | 3/2006 | Metz .................... A61G 7/0527 52/309.8 |
| 2012/0090901 A1 | * | 4/2012 | Jaeger .................... G01F 23/20 177/132 |
| 2016/0202111 A1 | * | 7/2016 | Fahey ................... G01G 19/10 177/141 |
| 2017/0307423 A1 | * | 10/2017 | Pahwa ................... G01G 19/18 |

\* cited by examiner

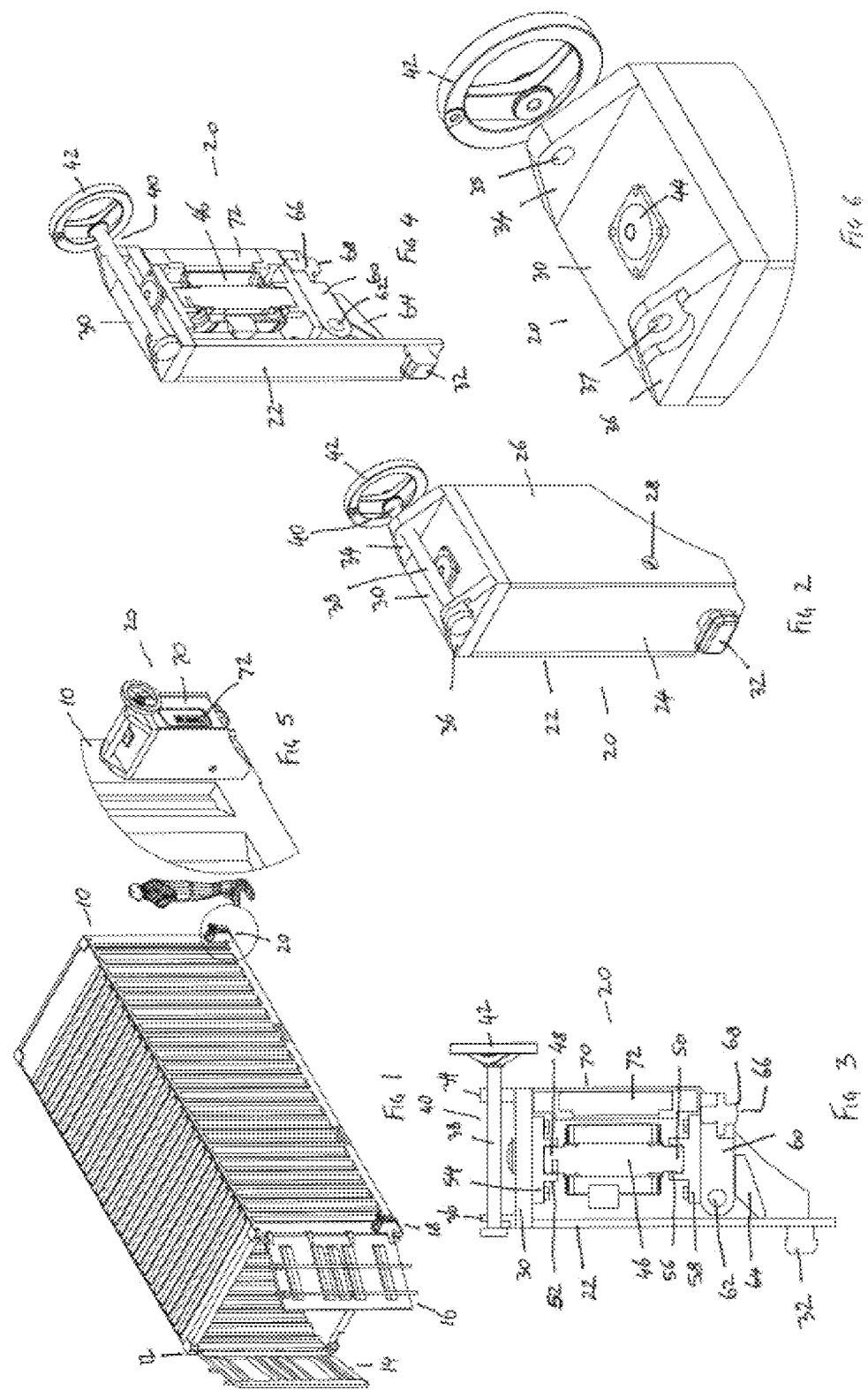

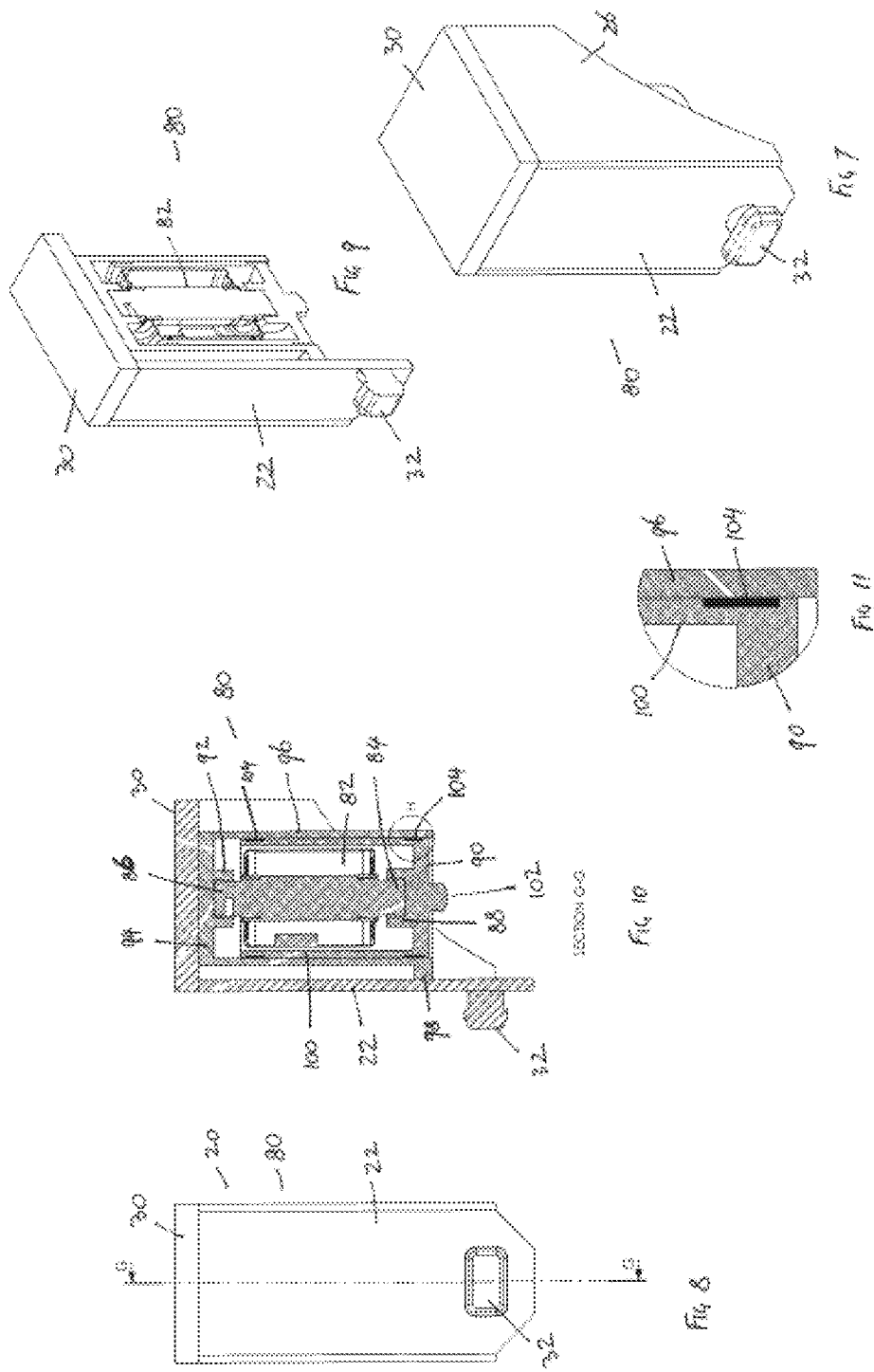

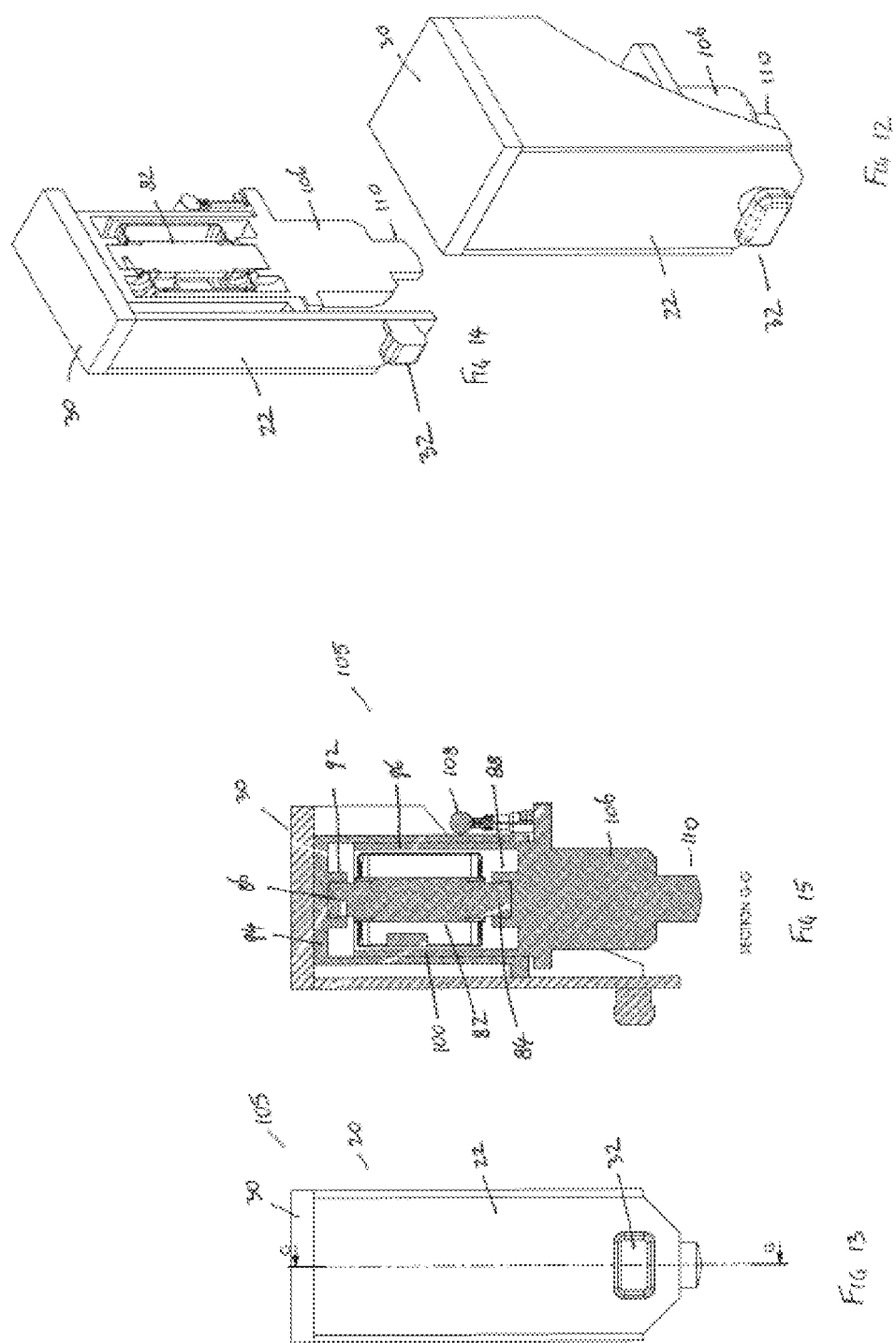

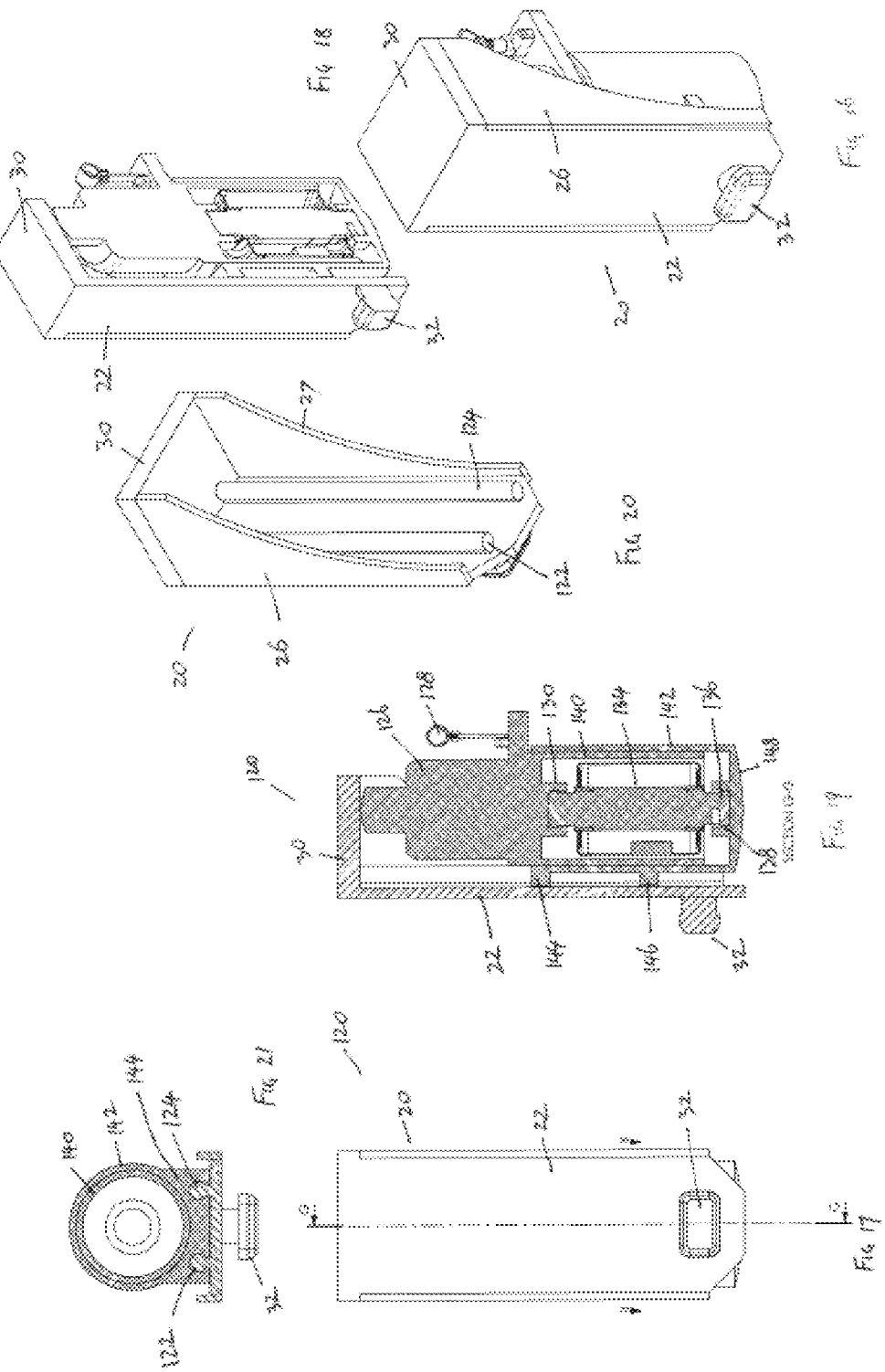

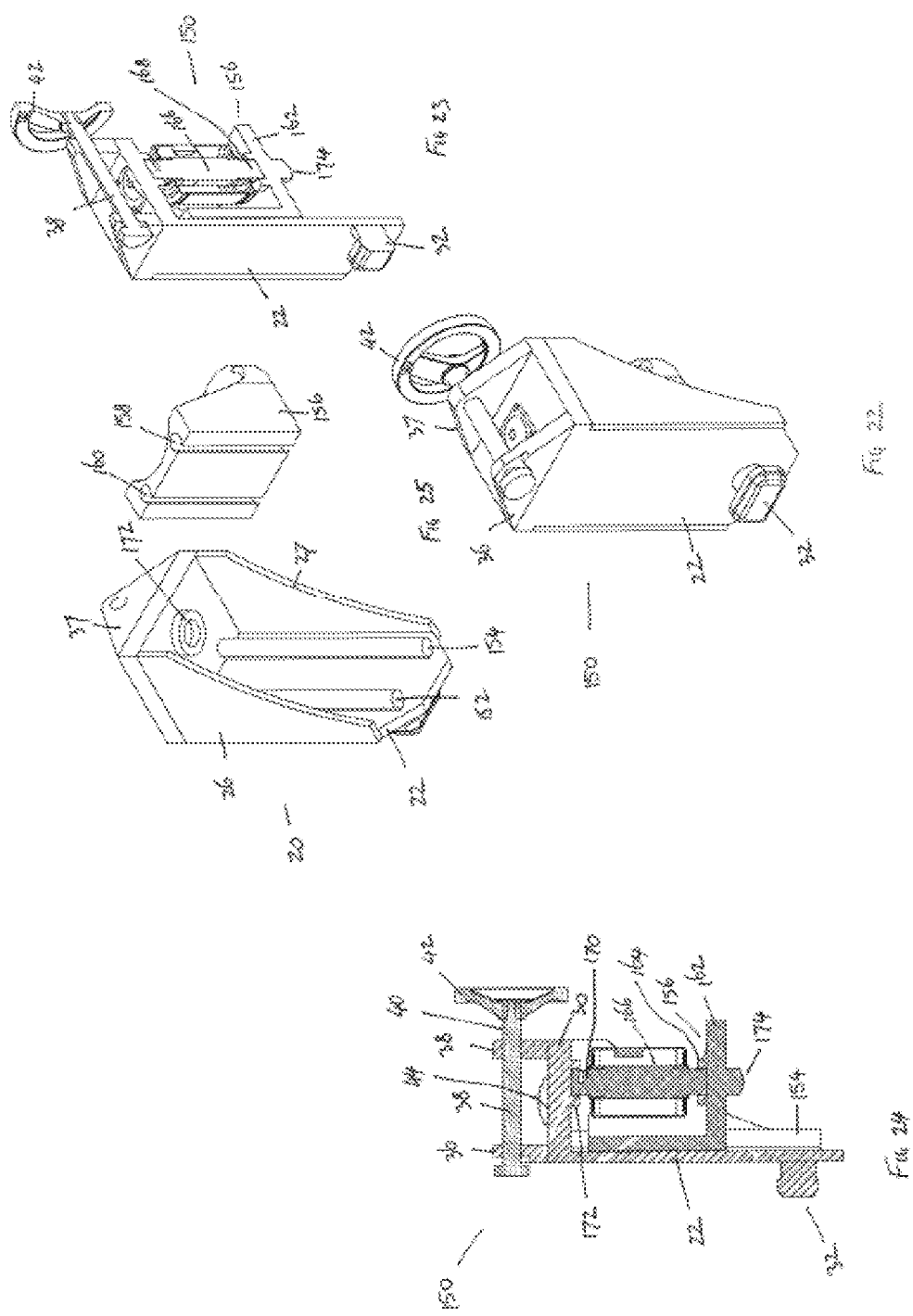

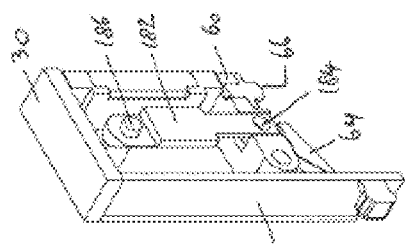
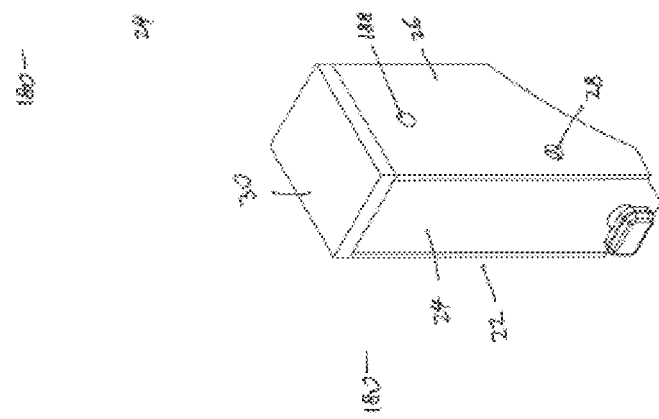
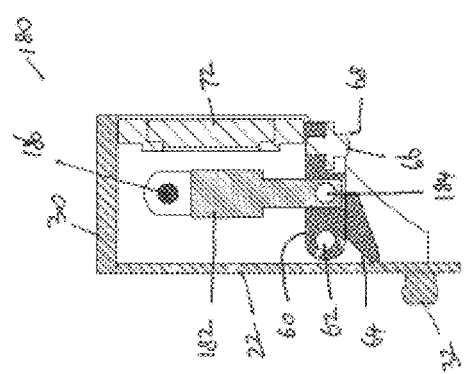

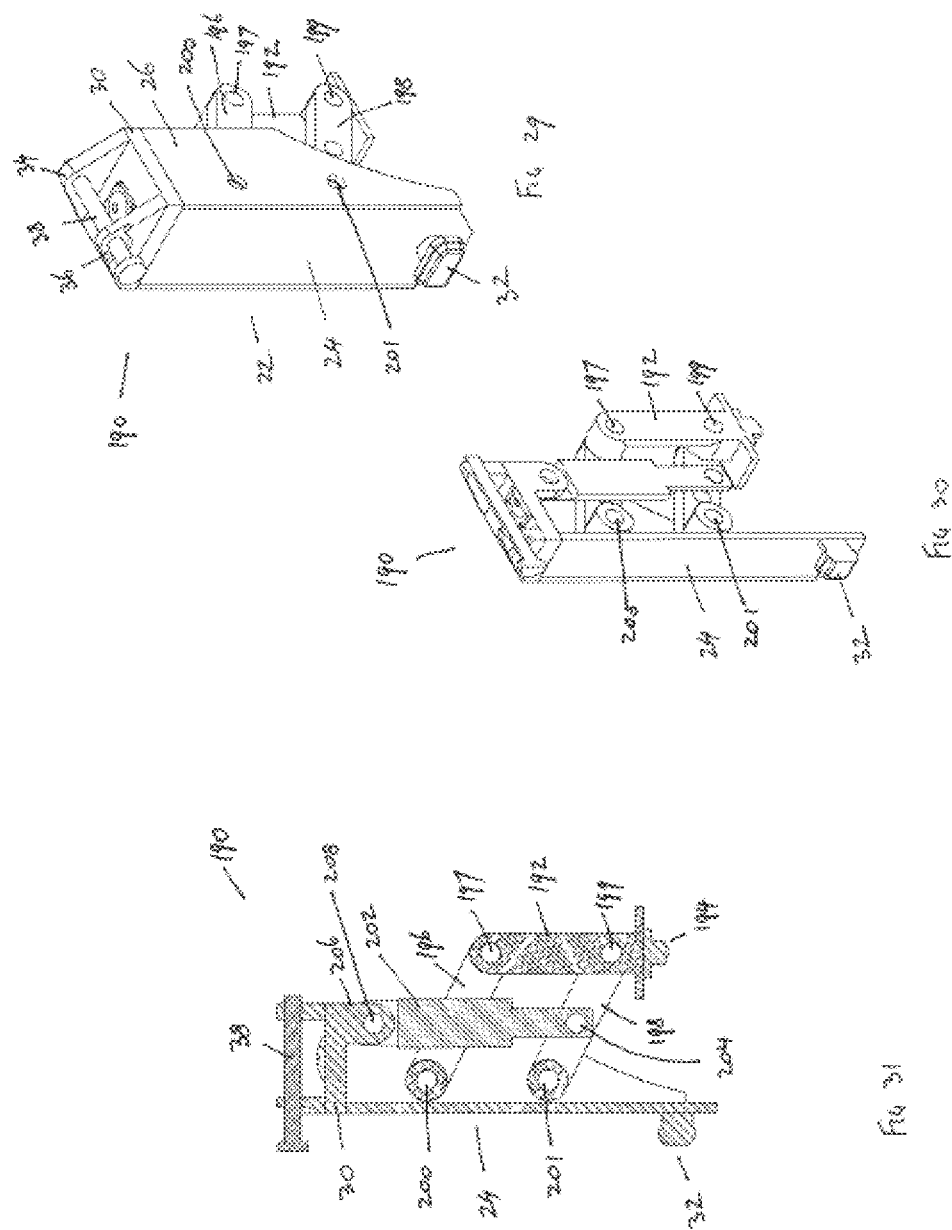

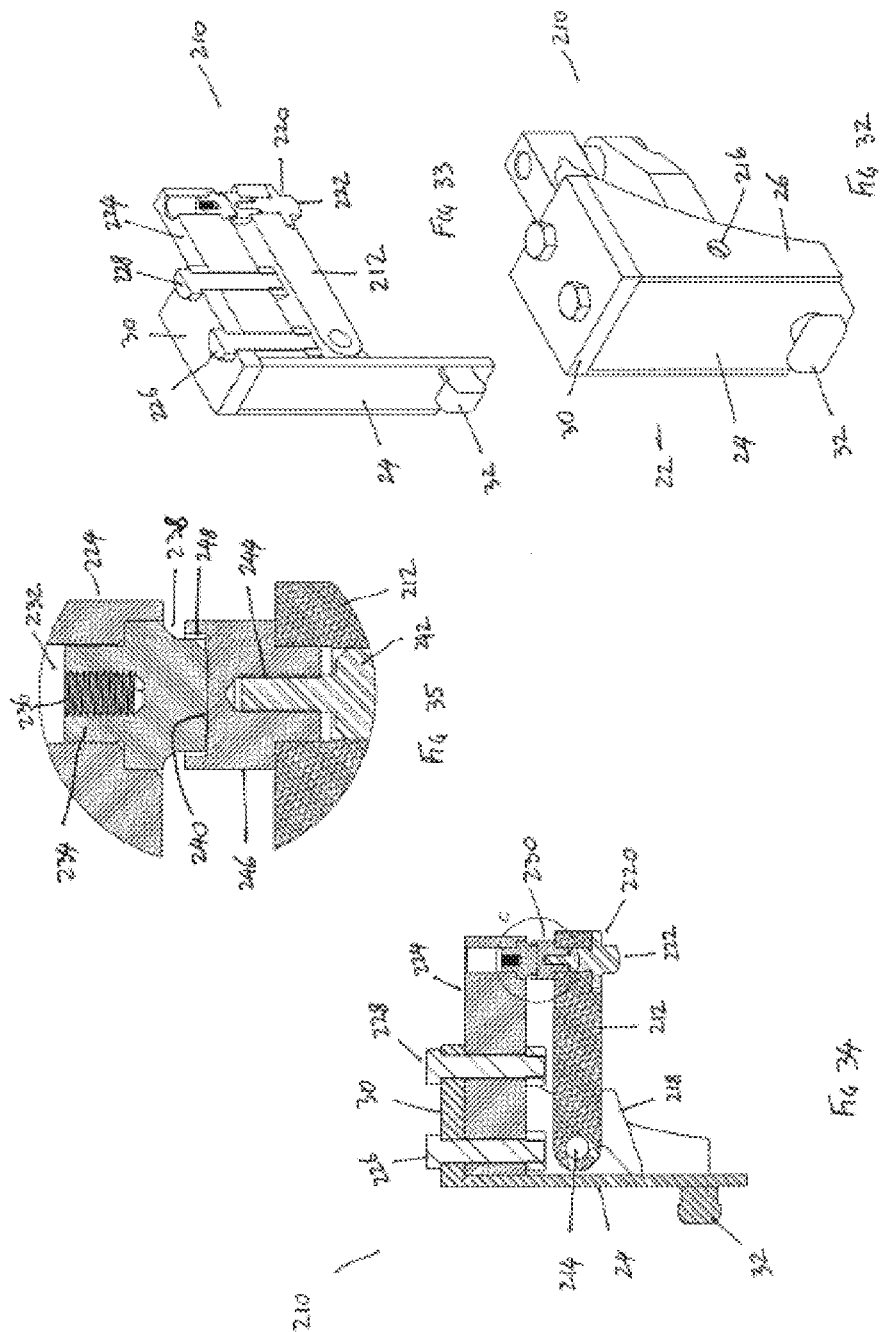

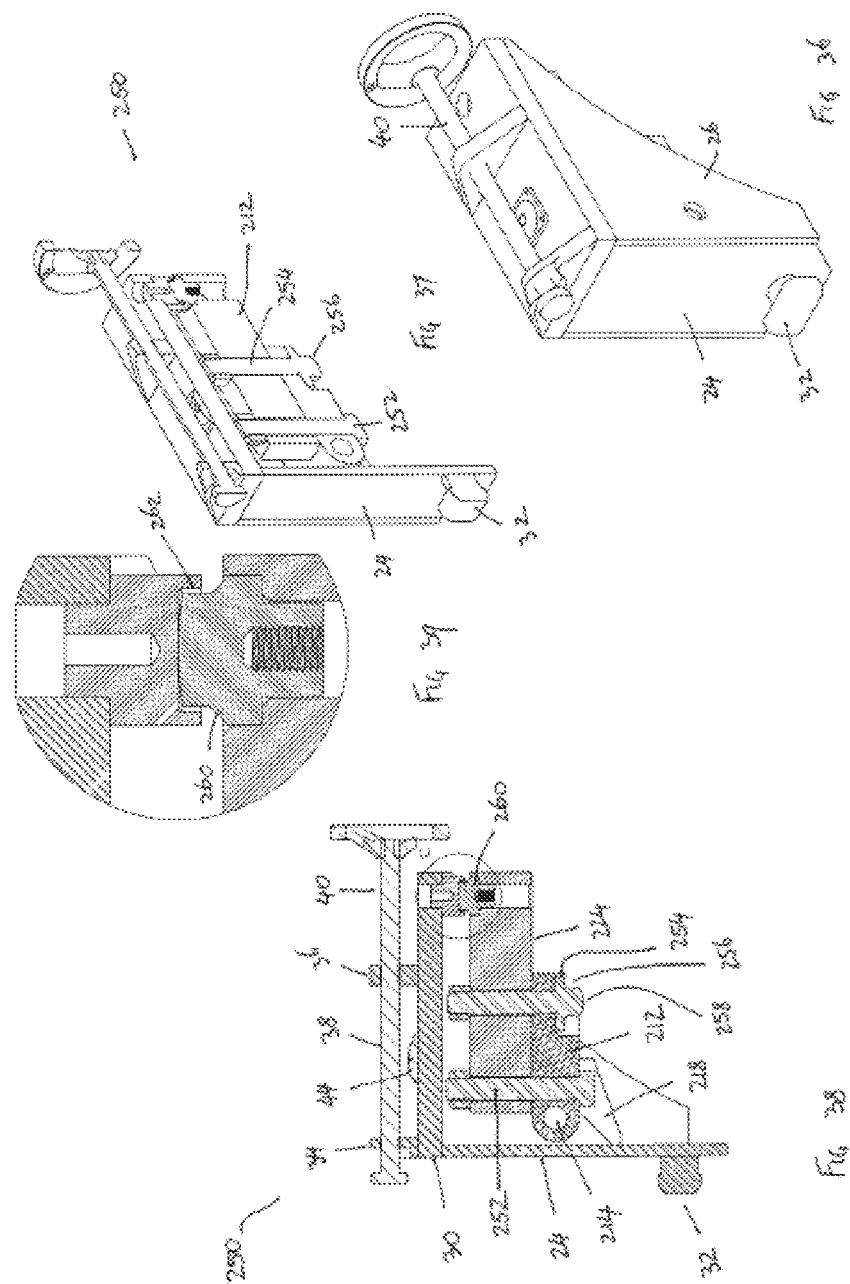

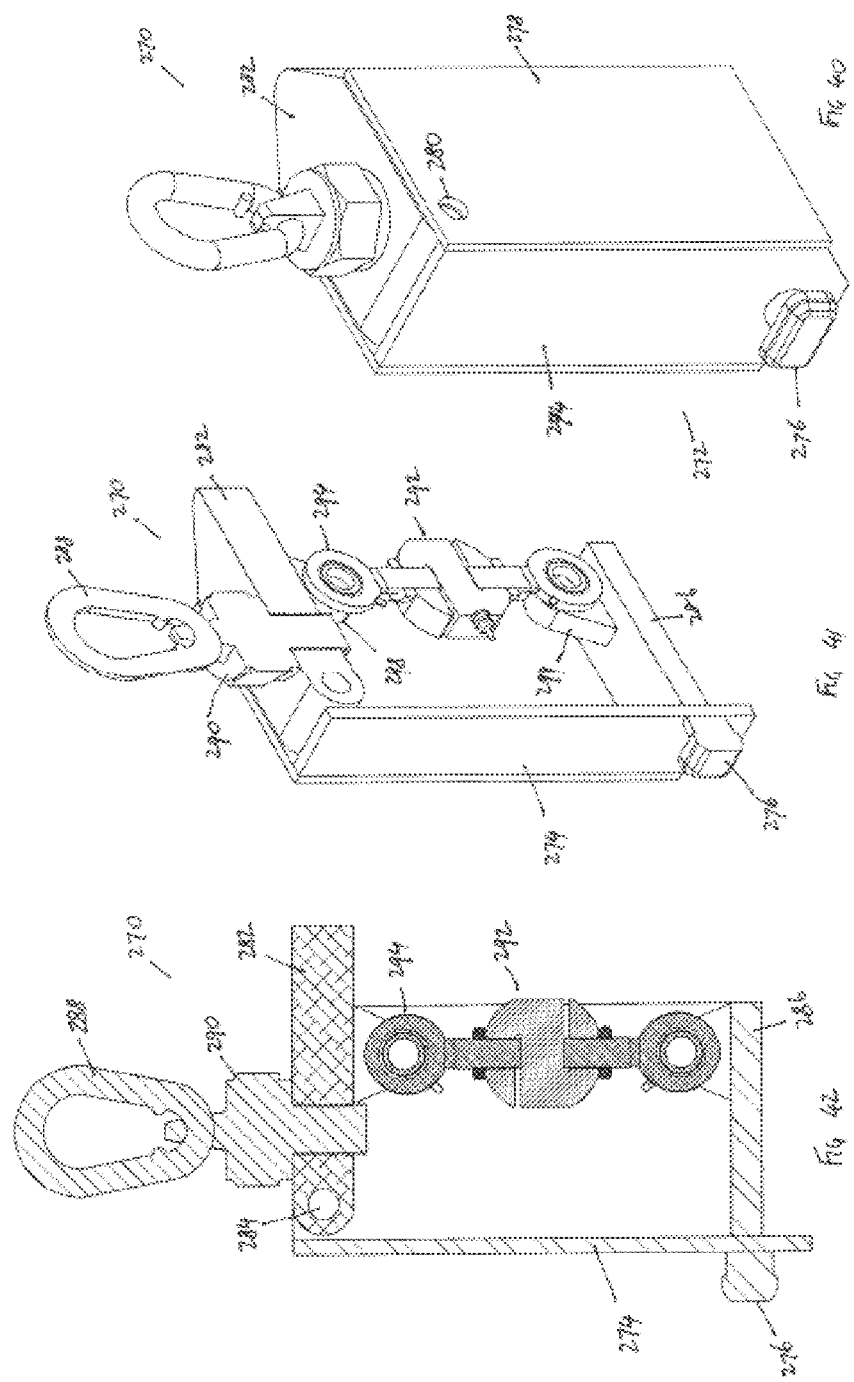

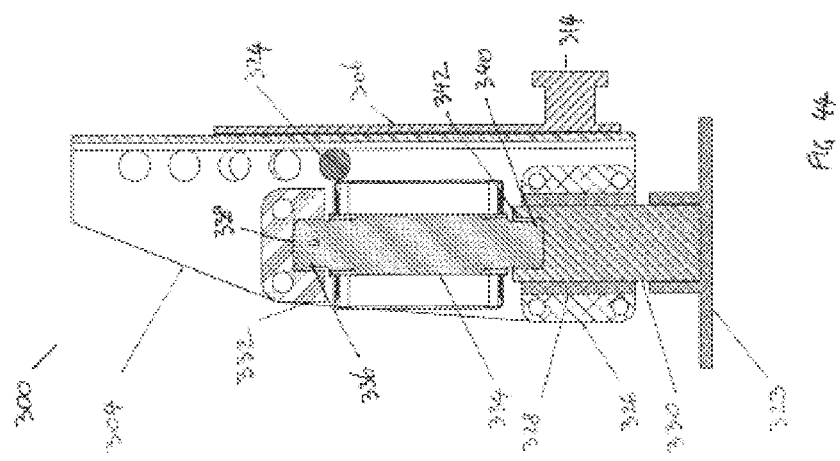
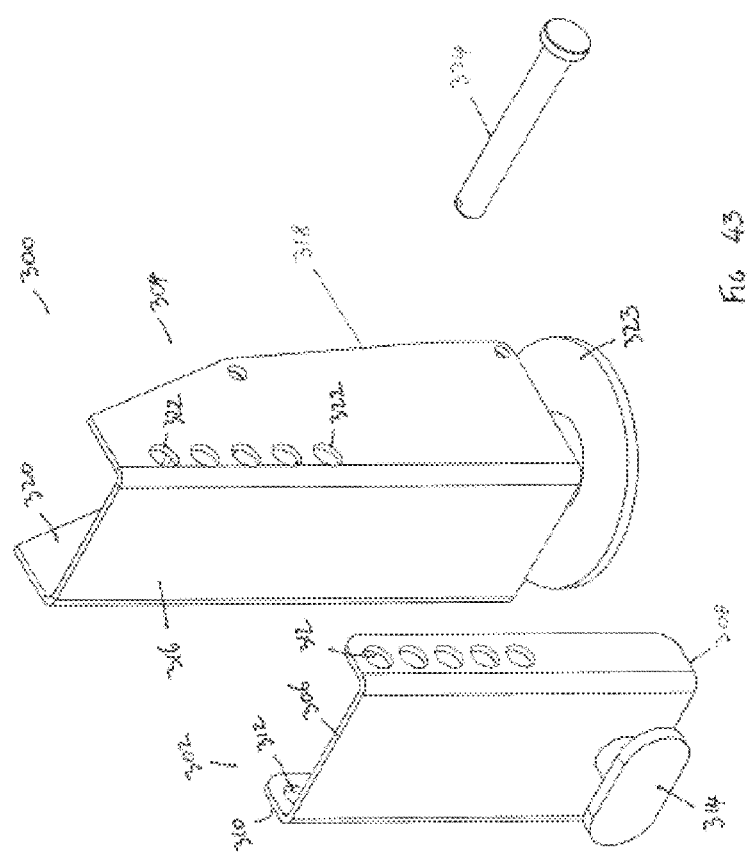

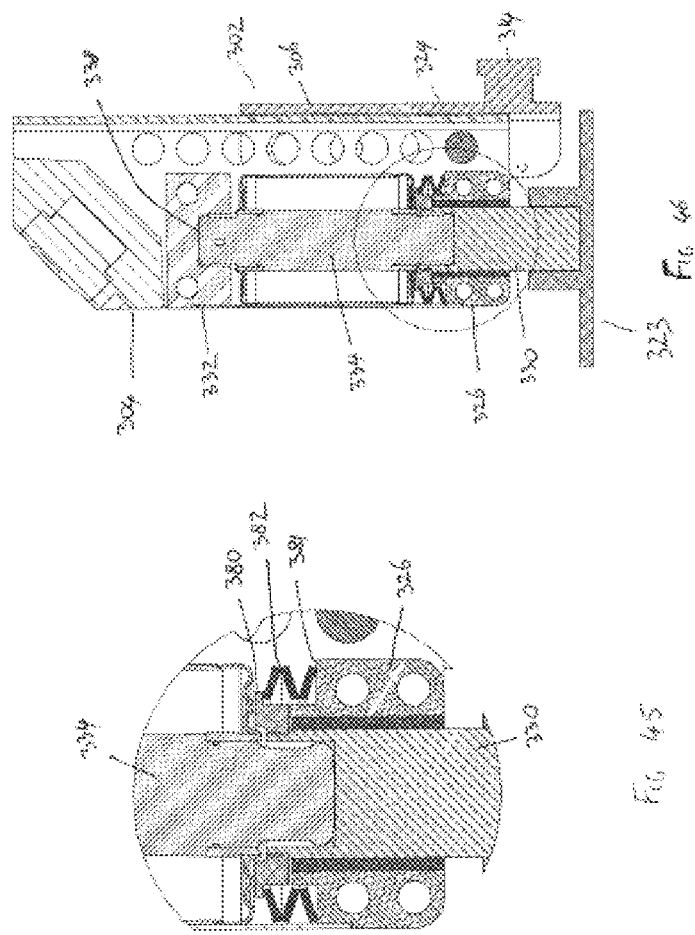

Central server charges / invoices the customer according to a schedule of rates set in the administration portal of the central server database. Either credit card, auto debit or debited against corporate account Weighing results (weight certificate) delivered in digital format such as PDF document. Including relevant data stored from the booking including but not limited to gross mass and cog.

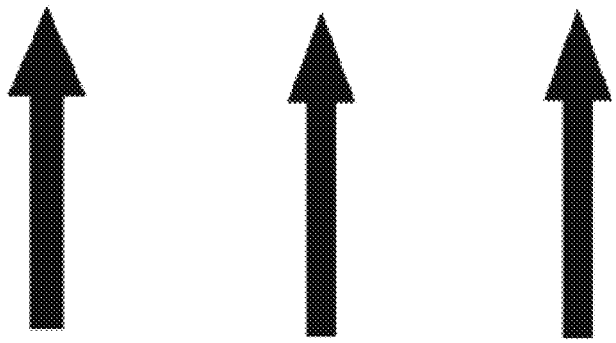

Any booking data including but not limited to the weight & container id can be presented or injected into a 3rd party database such as a port authority or freight forwarder Service provider / contractor is paid for the service according to the schedule of rates set in the administration portal of the central server database.

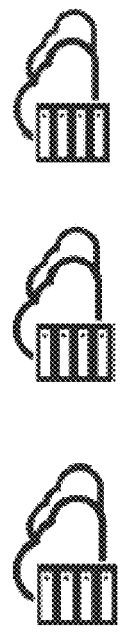

CENTRAL SERVER POST SERVICE PROCESSING

FIG 48

Conweigh Post Service Flow

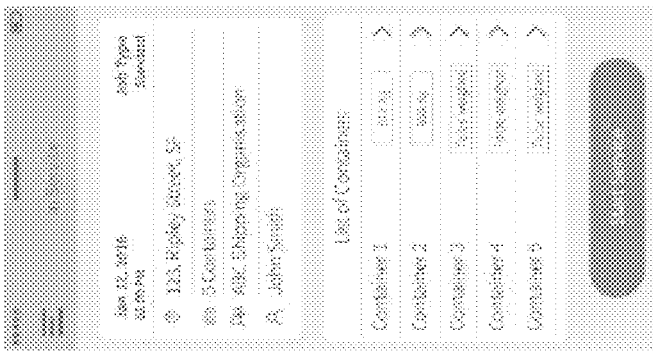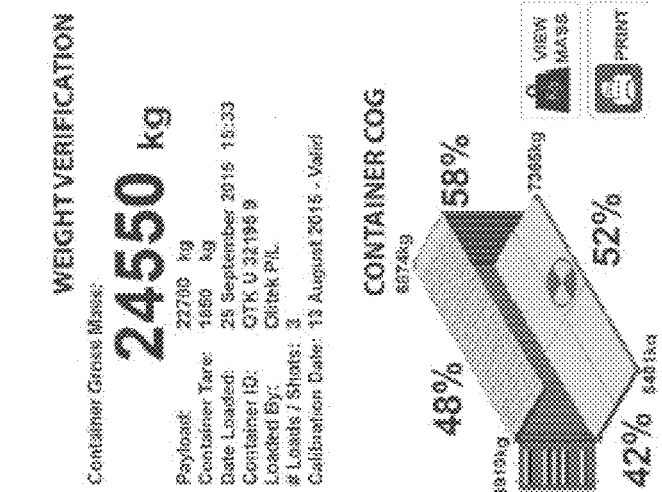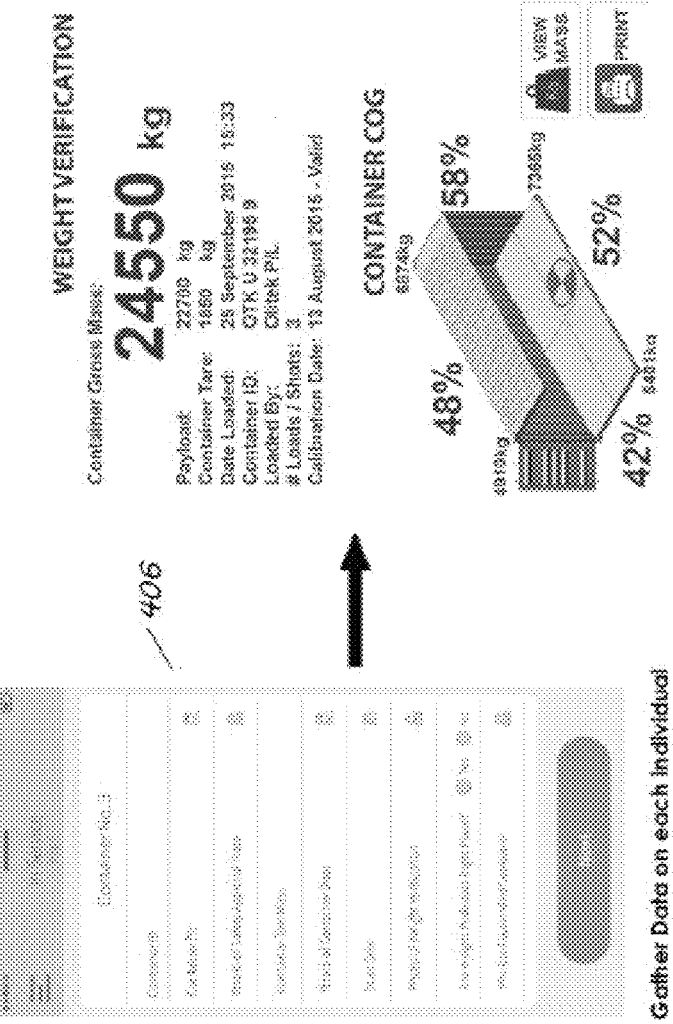
FIG 50

Step 7

Service provider is shown an overall summary after each container weighing is completed with the option to pause, cancel or continue the weighing operation.

Step 8

On completion of all containers registered in the booking, the service is completed and saved / submitted.

A final checklist may also be required for the booking in order to be marked as completed.

Step 9

When the Mobile device has data connection, all data from service and weighing processes is uploaded to the central server for billing and final weight certificate to be sent.

FIG 51

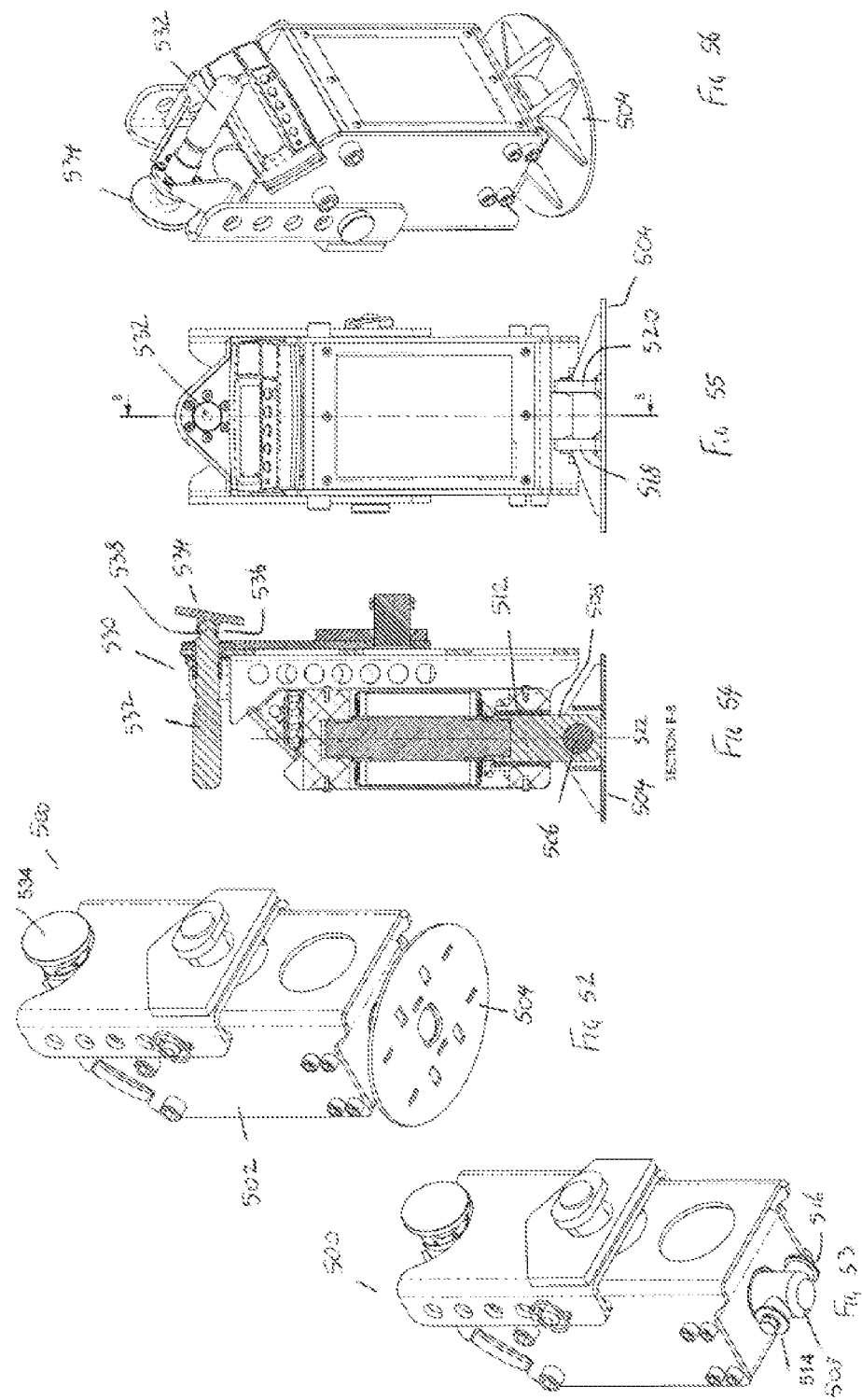

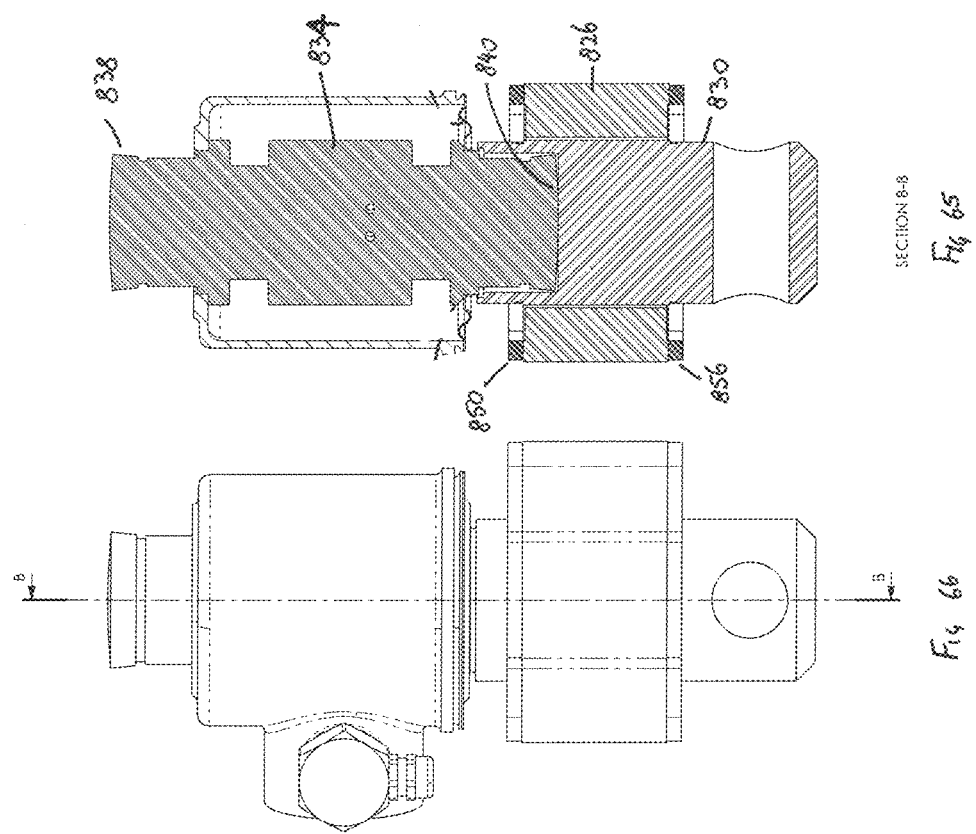
Fig 65
Fig 66
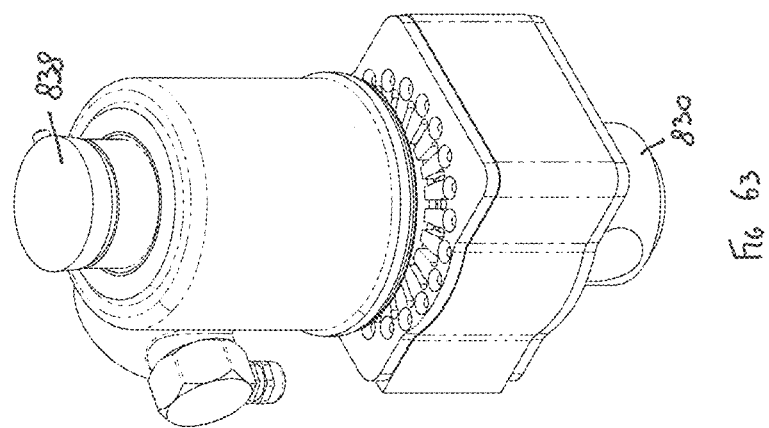
Fig 63
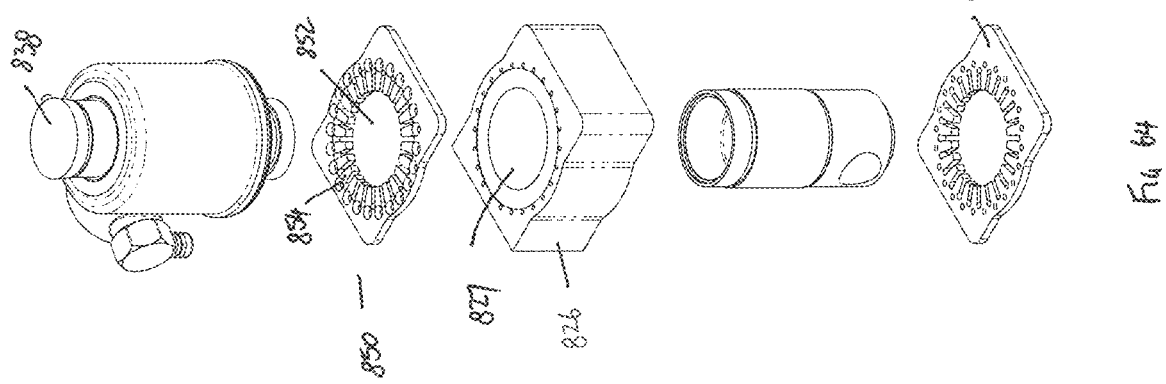
Fig 64

APPARATUS INCLUDING A BRACKET CONNECTOR FOR DETERMINING THE WEIGHT OF AN OBJECT SUCH AS A SHIPPING CONTAINER

RELATED APPLICATIONS

This application is a national phase of PCT/AU2016/051053, filed on Nov. 4, 2016, which claims the benefit Australia Application No. 2016904043, filed on Oct. 5, 2016, Australia Application No. 2016902595, filed on Jul. 1, 2016, Australia Application No. 2016900534, filed Feb. 16, 2016, Australia Application No. 2016200333, filed Jan. 20, 2016 and Austria Application No. 2015904570, filed on Nov. 6, 2015. The entire contents of those applications are hereby incorporated by reference.

TECHNICAL FIELD

The present invention relates to an apparatus for determining the weight of an object. In one embodiment, the apparatus is used to determine the weight of a shipping container. The present invention also relates to a method for weighing objects and to a system for recording the weight of an object.

BACKGROUND ART

Cargo is frequently transported using ISO standard shipping containers. ISO standard shipping containers may be simplistically described as large metal boxes into which cargo is placed. The shipping containers can then be moved and placed by transport handling equipment onto various vehicles, such as trucks, trains and ships. As the ISO standard shipping containers come in a relatively small number of standard sizes, standardised container handling equipment and standardised container loading patterns can be used.

Containers are physically large, heavy objects. For example, some shipping containers have a length of 40 feet (12.192 m), a height of 8'6" (2.591 m) and a width of 8 feet (2.438 m). Applicable ISO standards allow such shipping containers to have a total gross mass when loaded of up to 30,480 kg. Operator safety is very important when handling such large, heavy objects.

The International Maritime Organisation has recently passed SOLAS (Safety of Life at Sea) regulations requiring that every container loaded onto a ship must have its weight verified by a local authority. In the absence of such verification of weight of the container, that container will not be allowed to be loaded onto a ship. Ideally, the weight of a container should be determined before it reaches the port or docks as if a loaded container is weighed at the port or docks and it is overweight, that container will be rejected and will need to be repacked and reweighed. Thus, it is desirable to have the weight of the container determined at vanning or shortly after vanning.

There are two possible ways of determining the total weight of the container. One is to load the container and move it onto a weighbridge to weigh the total weight of the container. The other is to weigh the total weight of cargo, pallets and strapping loaded into the container and add that to the tare weight of the container to determine a total weight of the loaded container.

Any apparatus that is used to determine the weight of the shipping container must be able to accurately weigh the shipping container and also be robust and resistant to damage.

It will be clearly understood that, if a prior art publication is referred to herein, this reference does not constitute an admission that the publication forms part of the common general knowledge in the art in Australia or in any other country.

SUMMARY OF INVENTION

The present invention is directed to an apparatus for weighing an object. In some embodiments, the apparatus may be used to weigh a shipping container.

With the foregoing in view, the present invention in one form, resides broadly in an apparatus for determining a weight of an object, the apparatus comprising a connector for connecting the apparatus to the object, an engagement region for engaging with a lifting mechanism for raising the object when the connector is connected to the objector for engaging with a support or suspension arrangement to support the container in a raised position, and a weighing sensor for determining a load applied by the object when the object has been lifted or supported, wherein the apparatus is arranged such that when the object is lifted or supported an essentially unidirectional force is applied to the weighing sensor.

In one embodiment, the essentially unidirectional force is applied to the weighing sensor in a direction such that the weighing sensor is always loaded correctly and consistently to give accurate results from the object being raised by the apparatus. In one embodiment, the essentially unidirectional force applied to the weighing sensor comprises an essentially vertical force.

In one embodiment, the apparatus is arranged such that essentially the entire load applied by the object is transmitted through the weighing sensor. Accordingly, in a second aspect, the present invention provides an apparatus for determining a weight of an object, the apparatus comprising a connector for connecting the apparatus to the object, an engagement region for engaging with a lifting mechanism for raising the object when the connector is connected to the objector for engaging with a support or suspension arrangement to support the container in a raised position, and a weighing sensor for determining a load applied by the object when the object has been lifted or supported, wherein the apparatus is arranged such that essentially all of the load applied by the object is transmitted through the weighing sensor.

In a third aspect, the present invention an apparatus for determining a weight of an object, the apparatus comprising a connector for connecting the apparatus to the object, an engagement region for engaging with a lifting mechanism for raising the object when the connector is connected to the object for engaging with a support or suspension arrangement to support the container in a raised position, and a weighing sensor for determining a load applied by the object when the object has been lifted, wherein the apparatus is arranged such that when the object is lifted or supported an essentially unidirectional force is applied to the weighing sensor and such that essentially all of the load applied by the object is transmitted through the weighing sensor.

In one embodiment, the object comprises a shipping container. For convenience and brevity of description, the object will be hereinafter described in this specification as a shipping container. However, it will be understood that the apparatus of the present invention may also be used to determine the weight of other objects.

In one embodiment, the connector comprises an ISO connector to connect to an ISO corner connector on a shipping container. The ISO connector may comprise a twist lock connector. In another embodiment, the ISO connector cannot move relative to the apparatus and the apparatus can be rotated by 90° to connect the ISO connector to an ISO corner connector on a shipping container. The design and construction of such an ISO connector will be well known to a person skilled in the art.

In one embodiment, the apparatus includes a housing. The connector may extend from the housing. The weighing sensor may be located within the housing.

In one embodiment, the weighing sensor comprises a load cell. The load cell may comprise a compression load cell, a bending load cell or a tension load cell. The load cell may comprise a compression load cell, a shear pin load cell, a shear beam load cell. Other weighing sensors may also be used. Examples include beam load cells, ring torsion load cells, single point load cells, canister load cells, tension load cells, plate load cells and force load cells. The skilled person will appreciate that there are many commercially available weighing sensors that could be used in the present invention.

Other weighing techniques may also be used. Examples include hydraulic pressure on a known area supporting the load, electrical actuators. Other methods of measuring deflection other than resistance load cells may be used, such as physical deflection monitors, video extensometers, and digital image correlation. Any apparatus to measure deflection, strain or stress including speckle shearing interferometry, electrical strain gauges, mechanical deflectometers, visual or video deflectometers, wave and frequency deflectometers may be used to achieve the measurement of the load.

As mentioned above, in one embodiment, the apparatus comprises a housing. The housing may comprise a rear face that, in use, is located adjacent to the object, one or two side faces and a top face. The housing may have a lower opening. The housing may have an opening on front side of the housing. The housing may also have a front face.

The housing may be provided with a level indicator, such as a level bubble or a spirit level or electronic level sensor. The housing can also be provided with an electronic or analogue display that can display the load determined by the weighing sensor and may also integrate with the electronic level sensor to ensure accuracy of reading. Suitably, the electronic or analogue display displays the weight that is being carried by the apparatus when the object has 100% of the weigh suspended by the load suspension point.

The present invention may also have a sensor that communicates via clear line of sight underneath the container to verify that the container is completely suspended with no obstacles that may be present supporting any part of the container weight before displaying the weight reading.

The housing may be provided with a leveling device to enable the housing to be leveled. The leveling device may allow the housing to be leveled after it has being connected via the connector to the object. The leveling device may comprise a leveling screw that can be turned to engage with the object to thereby enable the apparatus to be leveled, other embodiments may include a hydraulic jack in place of the screw to provide the required force to hold the housing in the correct position relative to the container to ensure only force in the direction of gravity is measured. This leveling force may also be achieved by gearing, screws, jacks or other means of applying mechanical force and relative motion between 2 objects.

In one embodiment, the leveling device may be provided with an engagement surface that comes into contact with a side of the object being weighed during use. The engagement surface may comprise a curved surface. In one embodiment, the curved surface may comprise a hemispherical surface. Alternatively, the engagement surface may rotate in two directions relative to the leveling device. In one embodiment, the engagement surface comprises a plate that is mounted to the leveling device via a universal joint or via a ball and socket joint to thereby allow rotation of the plate relative to the leveling device. The leveling device may comprise a pin having the engagement surface attached thereto. Alternatively, the leveling device may comprise a pin having a rounded arm. The leveling device may be adjustable towards and away from a side wall of the container attached to the weighing apparatus.

In one embodiment, the lifting mechanism comprises an extendable arm or rod. The extendable arm or rod may be part of a jack or a jacking arrangement. The jack may comprise a hydraulic jack. Other jacks, such as scissor jacks, rack and pinion jacks, screw jacks, electrical actuation jacks, fulcrum & lever jacks, pneumatic airbags and other commercially available jacking lifting devices may also be used. The jack may be operated to extend the arm to thereby raise the object.

In another embodiment, the lifting mechanism comprises a retracting mechanism that raises the object when the retracting mechanism is retracted. The lifting mechanism may comprise a crane. The lifting mechanism may comprise a gantry jack retracting to lift, overhead hydraulic cylinder retracting to lift the object, overhead winching hoist retracting to lift the object, conventional or tension ball screw providing force to lift from above, fulcrum lever jacks retracting to provide overhead lifting force, any mechanism that is retracted to raise the object. Other commercially available overhead lifting devices may also be used such as block and tackle, endless chain (chain block), cable/rope and pulley system.

The engagement region that engages with the lifting mechanism may comprise a region that comes into contact with a part, normally an end, of an extendable arm or rod. Alternatively, the engagement region may comprise a loop or a bar that comes into contact with a lifting hook. The lifting hook may be connected to a gantry jack or a mobile crane. In another embodiment, the engagement region comprises a region that enables a chain or a cable to be connected thereto, with retraction of the chain cable lifting the object. The chain cable may simply wrap around or extend under the engagement region.

In some embodiments, the container may be lifted and the weighing apparatus of the present invention connected thereto and the container subsequently lowered so that the engagement region of the weighing apparatus rests on a support that supports a container above the ground. In this manner, the weighing sensor can be loaded as described above to provide accurate weight readings. The apparatus of some embodiments of the present invention is arranged such that when the object is lifted or supported, the weight of the object applies a unidirectional force to or through the weighing sensor.

In one embodiment, the weighing sensor comprises a load cell. The key to reliable and high performance weighing using a load cell is to ensure optimum load introduction even under adverse conditions. Load cells are designed and tested to measure load through their primary axis. Any irregular loading which introduces off axis forces as a result of poor mounting arrangements will almost certainly introduce unwanted errors and can cause permanent mechanical damage to the load cell. The present invention, in ensuring that the weight of the object applies a unidirectional force to the load cell, will result in the load cell providing greater accuracy in its readings whilst also avoiding or minimising the likelihood of damage to the load cell that could occur if an "off-line" forces are applied to the load cell.

In a further embodiment, the apparatus is also arranged such that essentially the entire load applied by the object is transmitted through the load cell. In this manner, the housing or other parts of the apparatus do not transmit any of the load applied by the object when it has been lifted. Therefore, more accurate and reliable readings are obtained because the weight of the object is being transmitted through the load cell rather than the weight of the object also being partly carried by the housing.

In one embodiment, the apparatus comprises a load cell positioned between an upper surface and a lower load arm. The lower load arm is pivoted to the housing. The lifting mechanism or load support engages with the lower load arm. The lower load arm may be provided with a stop member to ensure that it is located at this orientation. When the lifting mechanism is actuated to lift the object or the object is supported completely by the load support point, the weight of the object is applied in an essentially vertical direction through the load cell. If the lifting mechanism or load support is mis-aligned, any horizontal component of force arising from the misalignment will be carried by the housing and not transmitted through the load cell. In some embodiments, the load cell effectively floats in position between the upper surface and the lower load arm. In some embodiments the lower load arm extends essentially perpendicularly to a rear face of the housing.

In another embodiment, the load cell is positioned between an upper surface and a lower surface. One of the upper or lower surfaces may be able to reciprocally move towards and away from other of the upper or lower surfaces. When the lifting mechanism is used to raise the objector the object is supported completely by the load support point, the weight of the object tends to push the upper surface and the lower surface towards each other. As the load cell is located between the upper surface and the lower surface, the load cell measures the weight of the object In this embodiment, the upper surface may be fixed and the lower surface may move. The lower surface may move in a telescopic manner relative to the upper surface. Alternatively, the lower surface may be fixed and the upper surface may move. The upper surface may move in a telescopic manner relative to the upper surface. Any side or off axis loading is absorbed by the telescopic mechanism and not transmitted to the load cell while still enabling all of the axial loading to be measured so the weight of the object is weighed correctly.

Alternatively, the housing may be provided with one or more guides and part of the apparatus associated with or connected to the movable one of the upper surface or lower surface may be free to slide along the one or more guides when the object is being lifted or weight of the object lowered onto the load support point.

In one embodiment, the apparatus is provided with an upper surface and a lower surface, with the load cell being located between the upper surface and a lower surface. The upper surface may include a downwardly extending hollow member and the lower surface may include an upwardly extending hollow member. The downwardly extending hollow member and the upwardly extending hollow member may move telescopically relative to each other. The respective hollow members may have any suitable cross-section shape, such as circular, square, rectangular, triangular or indeed any shape allowing telescopic movement.

In a further embodiment, the lower surface can reciprocally move along one or more guides in the housing to enable the lower surface to reciprocally move relative to the upper surface. In another embodiment, the upper surface can reciprocally move along one or more guides in the housing to enable the upper surface to reciprocally move relative to the lower surface.

In another embodiment, the lower surface comprises a load guide that can move through a guide bush or guide block to thereby apply a unidirectional force to the load cell. The lower end of the load guide may rest on a base or a foot. The base or the foot may bear a weight of the container when the apparatus is connected to the container.

In a further embodiment, the apparatus comprises a load arm pivotally connected to the housing, the load arm carrying a link arm that is pivotally connected at one end to the load arm and pivotally connected at or near another and to the housing. In this embodiment, the load cell may be located in or on one or both of the pivot pins that connect the link arm to the load arm of the housing. The link arm may also comprise a load cell. The link arm may also comprise an alternative weighing sensor, such as a hydraulic pressure cylinder.

In another embodiment, the apparatus may comprise two or more link arms, each link arm pivotally connected at or near one end to the housing and being pivotally connected at or near the other end to the lifting mechanism or load support. A link arm may be pivotally connected at or near one end to one of the link arms and pivotally connected at or near its other end to the housing. The weighing sensor may comprise the link arm. Alternatively, the weighing sensor may be positioned in one or both of the pivot pins connect the link arm to the load arm and the housing.

In a further embodiment, the apparatus comprises a load arm pivotally connected at or near one end to the housing. The lifting mechanism or load support engages with the load arm. A shear beam load cell is mounted to the housing and the load arm engages with the shear beam load cell. The load arm may comprise an extending projection having a recess therein, the recess engaging with an engagement surface mounted to or formed on the shear beam load cell. Engagement between the load arm and the shear beam load cell may be arranged such that there is no side loading possible between the load arm and the shear beam load cell.

In a further embodiment, the apparatus may be provided with a load arm pivotally connected to the housing. A shear beam load cell may be connected to the load arm. The shear beam load cell may have an engagement surface that engages with the housing such that when the lifting mechanism is operated to lift the object or the object is completely suspended by the load suspension point, the load applied by the weight of the object passes through the engagement surface and into the shear beam load cell.

In one embodiment, the apparatus comprises a bracket having a connector for connecting the bracket to the object, the bracket including opposed side surfaces having a plurality of aligned holes formed therein, the apparatus further comprising a housing having opposed side surfaces, the opposed side surfaces having a plurality of aligned holes formed therein, the housing resting on a base, wherein the housing is connected to the bracket by use of one or more pins or other connectors such that the weight of the object connected to the bracket passes through the housing and through the base. It will be appreciated that the housing includes a weighing sensor that is arranged such that a unidirectional force and/or all of the weight of the container passes through the weighing sensor. In this apparatus, the container may be lifted by a separate lift apparatus (such as a crane or a plurality of jacks or a commercially available container lifting device such as those available from Chassis King) to a desired height at which the respective holes in the bracket and the housing come into alignment. A pin or other connector is then used to connect the bracket and the housing together and the separate lift apparatus is operated to thereby lower the container such that all of the weight of the container is borne by the weighing apparatus.

This embodiment is also useful for ensuring that the base of the housing can sit on the ground or other support surface regardless of the container height when the container is attached to the container attachment bracket. The container can be elevated with some other lifting device and the container can be attached to the container attachment bracket. Use of the multitude of pinholes can then allow the container attachment bracket to be secured to the housing at the desired elevation height. When the weight is lowered onto the housing, the container will remain level as all corners of the container can have the container attachment bracket secured at different heights by taking advantage of the height adjustability provided by the multitude of holes. In one example, using multiple holes with 5 mm differences in pitch on the container attachment bracket and the housing allows a fine adjustment of container height in 5 mm increments, arising from the pitch of the holes for receiving the pin or other connector.

In order to determine the weight of a shipping container, a weighing apparatus in accordance with the present invention is connected to each corner of the shipping container (therefore requiring four weighing apparatus in all). The lifting mechanism of each weighing apparatus is operated to lift the container off the ground, alternatively the weight of the container is lowered completely onto the load support point. The weighing sensor in each weighing apparatus can then determine the weight that is being carried by each of the weighing apparatus. The total weight of the container is the sum of the weights determined by the individual weighing apparatus.

In one embodiment, each weighing apparatus sends a signal indicative of a weight determined by the sensor to a weight calculator, the weight calculator determining a total weight of the load from the signals received from each weighing apparatus.

In one embodiment, the weight calculator determines a total weight of the container by adding the weight of the load measured by each weighing apparatus.

The weight calculator may include functionality to cause a written record of the total weight of the container to be printed. The total weight of the container may be printed on a sticker to adhere to the container. The total weight of the container may be printed and the written record subsequently attached to the container or placed in a holder mounted to the container. In this manner, the written record may be inspected by personnel involved with moving the container.

In some embodiments, the written record may also include a date that the weight was calculated. In some embodiments, the written record may also include a certification certifying that the weight has been properly determined.

In some embodiments, the weight calculator may comprise a programmable logic control (PLC) or a computer. The weight calculator may include appropriate algorithms to determine the total weight of the load. The weight calculator may also enable an operator to input a tare weight of the container. Alternatively, the weight calculator may enable an operator to enter an identifier for the container (such as a serial number). The weight calculator may record details of the container and the weight of the load that has been loaded into the container in an electronic file. The weight calculator may be operative to transmit details of the total weight of the container or the weight of the load in the container to a record-keeping facility or to an outside agency. The details may be transmitted via a wired communications network, or via a wireless communications network. The weight calculator may comprise an application or computer software loaded onto a mobile phone or cell phone.

In one embodiment, the device running the software may also be able to scan or enter an object identifier, such as an identification tag or container door seal in order to quickly reference or call up the weight registered to that particular object. The container door seal serves the purpose of both quick identification of the weight of the container from a central database and identification that the container has been weight verified. The container door seal may also provide evidence of the door being opened or the container being tampered with after the container has been weighed.

In another embodiment, the weight calculator may be incorporated into a booking application to allow customers to book service providers to attend a specified booking address with the mobile weighing devices, conduct the service using the device and weight calculator and submit the weight results to a central database or directly to the client as a "Verified Gross Mass". The booking and scheduling of this embodiment may operate similarly to other commercially available on demand booking applications such as Uber™.

In another aspect, the present invention provides a system for recording the weight of an object, the system comprising software loaded onto a user computer or a user mobile device that can access the Internet or other private or public network, the software including booking functionality to enable the user to book a service provider for weighing an object, the system further comprising software loaded onto a service provider computer or a service provider mobile device that can access the Internet or other private or public network to enable the service provider to receive a booking request from a user, the software loaded onto the service provider computer or service provider mobile device communicating with one or more weighing units that are used to determine the weight of the object such that the weight of the object is delivered via a network to the service provider computer or the service provider mobile device, the weight of the object subsequently being transferred from the service provider computer or the service provider mobile device to the user computer or the user mobile device or a third-party computer or a third-party mobile device or the weight of the object is delivered via a network to the user computer or the user mobile device or to a third party computer or a third party mobile device.

In one embodiment, the booking functionality may be similar to the booking functionality used by Uber™. In one embodiment, the booking functionality results in a booking request being sent from the user computer or user mobile device to the service provider and the service provider books in a time or date for conducting the service.

The system may comprise payment functionality that enables the user to make payment to the service provider for provision of services. The payment functionality may result in payment being made prior to the service being provided, or payment being made when the service is being provided, or payment being made after the service has been provided, or part payments being made before, during, and/or after provision of the service.

The software that is loaded onto the user computer or the user mobile device may be in the form of an app that is downloadable from the Internet or other network or uploaded to the device by other data transfer means. The app suitably contains all the functionality that is required from the user's perspective. It should be noted that the referred app may be in the form or a web portal, native software or application install or other common user interface means that allow the user to interact with the software functions.

The app or a service provider variation or service provider software or programming may also be loaded onto the service provider computer or the service provider mobile device. The service provider may configure the app such that the desired functionality is enabled.

The software that is loaded onto the service provider computer or service provider mobile device suitably allows the service provider computer or service provider mobile device to communicate with the weighing unit(s) or a controller that is used to control the weighing unit(s) such that a weight determined by the weighing unit(s) is transferred to the service provider computer or service provider mobile device. The service provider computer or service provider mobile device may also receive information relating to the identification of the object. In one embodiment, the service provider computer or service provider mobile device has scanning functionality that enables an identifier, such as an identification tag or barcode or a door seal associated with the object being weighed, to be scanned. This then allows details of the object to be weighed to be transferred to or stored in the service provider computer or service provider mobile device. In one embodiment, scanning of the identification tag or barcode takes place and then the service provider computer or service provider mobile device interrogates a remote database to obtain details of the object from the remote database. In another embodiment, details of the object may be entered into the service provider computer or service provider mobile device.

Once the weight of the object has been determined, the weight is sent to the service provider computer or the service provider mobile device and that weight is associated with the identification of the object. Details relating to identification of the object and the weight of that object may then be sent to a third party computer or third-party mobile device. This may occur by way of sending an email with relevant details of the weight of the object to the user computer or user mobile device. The email may include a certificate of weight. Alternatively, the relevant details may be sent to a database on a third-party computer or third-party mobile device, with the relevant details (including identification details and weight details for the object) being entered into or inserted into the database. The third-party computer may comprise the user computer or the user mobile device. Alternatively, the third party computer or third-party mobile device may comprise a computer or a mobile device of a shipping company or transport company.

In another aspect, the present invention provides a method for recording a weight of an object, the method comprising providing software to a user computer or a user mobile device, entering a booking request on the user computer or the user mobile device, the booking request being sent via a communications network either via a remote computer or directly to a service provider computer or a service provider mobile device, the service provider computer or service provider mobile device receiving the booking request, the service provider accepting the booking request, the service provider weighing the object using one or more portable weighing units, the weighing units or a controller controlling operation of the weighing units sending information relating to the weight of the object to the service provider computer or service provider mobile device, the service provider computer or service provider mobile device sending information relating to the weight of the object to the user computer or user mobile device or to a third party computer or third-party mobile device, or the weighing units or a controller controlling operation of the weighing units sending information relating to the weight of the object to the user computer or the user mobile device or to a third party computer or a third party mobile device.

In one embodiment, the step of weighing the object using one or more portable weighing units comprises weighing the object using one or more portable weighing units as described herein.

In one embodiment, the method may comprise identifying an object and providing identification details to the service provider computer or service provider mobile device or to a third party computer or third-party mobile device, or to a user computer or user mobile device. It may involve scanning an identifier attached to or otherwise associated with the object. The identifier may comprise, for example, a barcode, and RFID tag, a QR code or the like.

The method may further comprise the step of the service provider attaching a service provider identifier to the object. The service provider identifier may comprise a seal, such as a door seal for a shipping container. The service provider identifier may include a barcode, and RFID tag, a QR code or the like. In one embodiment, the service provider identifier contains an identifier that can be scanned by the service provider computer or by the service provider mobile device. The network may comprise the internet.

In other embodiments, some or all of the weighing devices taking the weight of the object may have a sensor or sensors to ensure there is no obstructions underneath the object being weighed that may be supporting any or all of the weight of the object. The software can prevent the final weight measurement result delivery until such obstacles are removed to ensure the load is completely suspended by the load weighing devices, this will also support accurate weight results.

In yet another embodiment, the software may communicate with the weighing devices to only allow activation and operation on successful parameter registration including, valid calibration date, level weighing devices, identification for competent operators or job booking confirmation for service applications. This feature will also add to the quality and accuracy of weight results.

In one embodiment, the system and the method involves using a set of weighing units. The set of weighing units may comprise a set of calibrated weighing units. The system and the method may comprise registering a plurality of weighing units as a set and recording a weighing unit identifier against a set identifier, and subsequently identifying weighing units to be used in a weighing operation and checking that each of the weighing units form part of a set. In this way, the operator or software can check that all weighing units belong together as a set. If they do not, the weighing units cannot be used to read weights or void the validity of the weight reading.

In some embodiments, multiple sets of weighing units may be used in close proximity to each other. The system and the method may further involve identifying a set of weighing units to be used in a weighing operation such that the system and the method only receives signals from the weighing units associated with that set. In this manner, only the relevant weighing units are read and weighing units that are being used in a nearby but different weighing operation are ignored by the system and the method.

In one embodiment, a set of weighing units are calibrated and each weighing unit is registered as an individual identifier such as a serial number and/or MAC address in a database. For a set of, say, 4 weighing units, the serial number of each of those 4 weighing units is recorded against an equipment set identifier (such as a set identification number or MAC address) in the database. When a weighing operation is commenced, the operator must scan or otherwise enter the equipment set identifier and scan or otherwise enter the serial number of each of the 4 weighing units that comprise the set. If the system confirms that the serial number of the 4 weighing units corresponds to the weighing units included in that equipment set identifier, the weighing operation is allowed to commence. Effectively, this operation can confirm that all weighing units belong together as a set. Further, it also ensures that it is only the weighing signals being sent by each weighing unit in that equipment set are received and entered into the database. In that way, if other weighing units are being used nearby, any weighing signals received by the operator's device from those other weighing units can be ignored or rejected.

In another embodiment, a set of weighing units are calibrated and each weighing unit is registered as an individual identifier such as a serial number and/or MAC address in a database. For a set of, say, 4 weighing units, the serial number of each of those 4 weighing units is recorded against an equipment set identifier (such as a set identification number or MAC address) in the database. When a weighing operation is commenced, the operator could scan or otherwise enter the equipment set and the device displaying the 4 devices (an example may be a phone with an app) will only recognise the 4 weighing units that have been registered as a set. If the system confirms that the identification number of the 4 weighing units corresponds to the weighing units included in that equipment set identifier, the weighing operation is allowed to commence. Effectively, this operation can confirm that all weighing units belong together as a set. Further, it also ensures that it is only the weighing signals being sent by each weighing unit in that equipment set are received and entered into the database. In that way, if other weighing units are being used nearby, any weighing signals received by the operator's device from those other weighing units can be ignored or rejected. In an yet another embodiment, a set of weighing units are calibrated and each weighing unit is registered as an individual identifier such as a serial number and/or MAC address in a database. For a set of, say, 4 weighing units, the serial number of each of those 4 weighing units is recorded against an equipment set identifier (such as a set identification number or MAC address) in the database. When a weighing operation is commenced, the device displaying the 4 devices (an example may be a phone with an app) will recognise the 4 weighing units that have been registered as a set. If the system confirms that the identification number of the 4 weighing units corresponds to the weighing units included in that equipment set identifier, the weighing operation is allowed to commence. Effectively, this operation can confirm that all weighing units belong together as a set. Further, it also ensures that it is only the weighing signals being sent by each weighing unit in that equipment set are received and entered into the database. In that way, if other weighing units are being used nearby, any weighing signals received by the operator's device from those other weighing units can be ignored or rejected.

In yet another embodiment, a set of weighing units are calibrated and each weighing unit is registered as an individual identifier such as a serial number and/or MAC address in a database. For a set of, say, 4 weighing units, the serial number of each of those 4 weighing units is recorded against an equipment set identifier (such as a set identification number or MAC address) in the database. When a weighing operation is commenced, the device displaying the 4 devices (an example may be a phone with an app) will recognise the 4 pedestals that have been registered as a set. If the system confirms that the identification number of the 4 weighing units corresponds to the weighing units included in that equipment set identifier, validations may be applied and communicated on the weight reading or adjust the weight reading when compared to the database. These inclusions may include but are not limited to weight classifications, weight accuracy, institute approvals, registration numbers, calibration or verification dates and records. The weight adjustments may include but are not limited to rounding & increment values, maximum and minimum allowable values for the registered device, sum checking or. The equipment set identifier may be compared to data fields including but not limited to the display device or model, display device operating system or software version, the user credentials or details that is registered, logged into or using the display device and in communicating with the registered equipment set. There may also be compatibility registrations in the database with the displaying device and related software and display inclusion, restrict weighing processes or adjust weight readings as described.

In yet another embodiment of the present invention the service provider computer or service provider mobile device and/or the user interface may include a series of checks including but not limited to safety checklists, quality checklists, booking validity or automated checking of the devices including but not limited to correct weighing device installation, container elevation sensors or other conditions that must be met or completed before the service provider computer or mobile device transmits a signal to the weighing device to allow a weight reading or data to be displayed or transmitted via the network. The weighing device may be programmed or equipped with a timer that must have aforementioned signal transmitted to the device frequently before the predefined time expires in order to remain in the "weighing" mode otherwise the weighing device may be programmed to power down or disable the weight display and weight data transmission.

In another aspect, the present invention provides a system for recording the weight of an object, the system comprising software loaded onto a user computer or a user mobile device that can access the Internet or other private or public network or locally stored data, the software receiving information from one or more weighing units in relation to weight of an object measured by the one or more weighing units, the software receiving information relating to the one or more weighing units, the software checking the information relating to the one or more weighing units to determine if the one or more weighing units passes one or more checks in relation to one or more of calibration of the one or more weighing units, verification of the one or more weighing units, certification of the one or more weighing units, registration of the one or more weighing units, type approval of the one or more weighing units, authority clearance of the one or more weighing units, the software including functionality such that the software can vary, alter or block one or more of a weight result received from the one or more weighing units, presentation of a weight result, data exchange of weight data with another database or generation of a certificate of weight in the event that the one or more weighing units do not pass one or more of the checks.

In this aspect, the software may further include the functionality as set out above in respect of the previous aspect of the invention.

In one embodiment of the present invention the service provider computer or service provider mobile device and/or the user interface may include one or more checks against a calibration, verification, certification, registration, type approval or measurement or other authority clearance on the weighing equipment before, during or after taking the weight reading to vary, altar or block the weight result, presentation, data exchange and/or certificate generation. This may include but not limited the service provider computer or service provider mobile device and or user interface recognising or having input a unique weighing device or device set identifier that would have been registered in the database. Recognising, selecting or entering the equipment ID may be performed in a number of methods such as MAC address scanning of both wired or wireless hardware, Bar code, QR code, RFID, chip scanning, location awareness or in fact any other means to uniquely identify a piece of weighing equipment. The database may have a number of fields to check against including but not limited to dates, times, locations, authorised users, calibration, verification, certification, registration, type approval or measurement or other authority clearance. This database comparison may be used to vary, alter or block the weight result and presentation, data exchange or certificate generation depending on the data and programmed logic of said computer, controller or user interface. One example of this may be a piece of equipment such as a weigh bridge which may be overdue for verification according to the date required in the database and produce a VGM certificate that clearly states that the certificate is not valid or the software will simply not allow the database to produce the VGM certificate or data at all, due to the weighbridge being overdue for verification. If a piece of equipment/weighing unit is not registered in the database then the same logic may apply. This check may be applied to a multitude of weighing devices that may include but not limited to weigh bridges, weighing platforms, multi point weighing devices, single point weighing devices, pallet scales, forklift truck scales, any other container handling equipment capable of weighing shipping containers or cargo, in fact any weighing device could be used in this method and using the software. The weight result may be transferred from the load receptor or weight indicator to the service provider computer or service provider mobile device and/or the user interface by blue tooth, WiFi, manual operator entry, cabled connection, photo recognition, voice or sound recognition or any other form of data transmission or recognition. This functionality described in the service provider computer or service provider mobile device and/or the user interface may also be inbuilt or programmed within the weight indicator or load receptor itself.

In one embodiment, the one or more weighing units may provide information relating to a geographical location of the one or more weighing units and a force measured by the one or more weighing units is adjusted in accordance with a geographical location of the one or more weighing units to determine a weight of an object being weighed by the one or more weighing units. In this regard, the value of the gravitational force varies across different locations of the earth. For example, gravity is not stronger in Melbourne than it is in Brisbane and a 40 ton container that is weighed in Brisbane and then wait in Melbourne using the same weighing units that have been calibrated in Brisbane will provide a measured weight that is approximately 38 kg heavier in Melbourne due to variances in the value of gravity between Brisbane and Melbourne. The weight value determined by the one or more weighing units can be therefore adjusted to compensate for changes in gravity across different geographical locations and therefore a more accurate weight determination can be made.

In one embodiment, determination of weight includes a step of determining a location where the one or more weighing units were calibrated, determining a current location of the one or more weighing units, and determining a correction factor for correcting the value of gravity between the location where the one or more weighing units were calibrated and the current location of the one or more weighing units.

In one embodiment, the one or more weighing units may include a GPS location device to provide information on the geographical location of the one or more weighing units. In another embodiment, the computer or other device onto which software is loaded may include GPS equipment to provide information on the geographical location of the computer or other device. In this embodiment, the software assumes that the one or more weighing units are located close to the computer or other device. The computer or other device may comprise a smart phone.

In another embodiment of the present invention, it may be possible to take a photograph of the container door or other identifying indicia on the container and take information from that photograph to populate a database or computer memory device with one or more details relating to the container. Details of the container may be derived from the photograph using visual recognition technology or software. For example, a user may take a photograph of a container number on the door of the container. That information may then be retrieved from the photograph and added to a database. All of the details of the container (such as tare weight) can then be retrieved, such as by being retrieved from a database in which other details of the container are recorded against the container number. Other retrieval methods may also be used. For example, if an identification plate on the container contains a container identification number, tare weight and other details, the container identification number, tare weight of the details may be retrieved or derived from the photograph. Visual recognition software is commercially available to achieve this outcome and the software need not be described further.

In one embodiment, it may be possible to also determine a location of a centre of gravity of the load. In this embodiment, the weight calculator may receive information relating to the weight borne by each of the weighing apparatus. Based upon the dimensions of the footprint of the load, the weight calculator can then calculate the location of the centre of gravity of the load/object.

In one embodiment, at least two or for a shipping container preferably four weighing apparatus are spaced from each other, each weighing apparatus determining a weight applied by the load to that weighing apparatus, the apparatus further including a weight calculator that receives signals indicative of the weight applied by the load to each weighing apparatus, the weight calculator calculating a total weight of the load and a location of the centre of gravity of the load.

In another aspect, a weighing apparatus in accordance with the present invention may comprise a support for supporting an object thereon and a weighing sensor for determining a load applied by the object when the object is supported on the support, wherein the apparatus is arranged such that when the object is supported an essentially unidirectional force is applied to the weighing sensor.

In a further aspect, the present invention provides apparatus for determining a weight of an object, the apparatus comprising a connector for connecting the apparatus to the object, a support for supporting the container in a raised position, and a weighing sensor for determining a load applied by the object when the object has been lifted or supported, wherein the apparatus is arranged such that when the object is lifted or supported an essentially unidirectional force is applied to the weighing sensor, or such that essentially all of the load applied by the object is transmitted through the weighing sensor, or such that when the object is lifted or supported an essentially unidirectional force is applied to the weighing sensor and such that essentially all of the load applied by the object is transmitted through the weighing sensor.

In a further aspect, the present invention provides a weighing system, the weighing system comprising a plurality of weighing apparatus as described herein.

In some embodiments, the apparatus may be arranged such that a pre-load is applied to the load cell. In some aspects, the apparatus may include preloading means for preloading the load cell. In this regard, most accurate and certified load measuring devices currently in use have the load cell carrying a small amount of dead load. For example, in a weighbridge, a steel platform is supported by the load cells. The dead load comprises the weight of the steel platform and the dead load preloads the load cells. When an object is being weighed, it is placed on the platform. The load cell readings will need to be "tared" or zeroed before putting the load to be measured on the weighbridge. The present inventor believes that the accuracy of weighing objects using the present invention will be improved if the load cells are preloaded. However, as preferred embodiments of the present invention relates to portable weighing units that will weigh typically less than 20 kg, the dead load applied by the weight of the weighing units is insignificant compared to the measured load. Therefore, including a preloading component will introduce a preload into the load cell. The preloading component may comprise a spring, a disc washer, a compression washer, a fluid pressure induced load (for example, using a hydraulic cylinder or pneumatic cylinder to apply a load), bolt tension or compression or elastic deflection of the surrounding structure. Indeed, the present invention incorporates any means that may provide a preloaded force to the load cell when the weighing unit is assembled for use.

In all aspects of the present invention, the weighing units may be portable units. This enables the weighing units to be moved from location to location. In some embodiments, a plurality of weighing units will be used together. The weighing units may be used to suspend an object, such as a shipping container, and then determine the weight of the object whilst it is suspended. The object, such as the shipping container, may then be lowered and the weighing units used to measure the weight of another object or shipping container. The weighing units may be small enough so that they can be moved by a single person. For example, the weighing units may be of a size and weight such that for the weighing units can be placed on a trolley and a single person can move the weighing units on the trolley. Ideally, the weighing units will have a weight that enables them to be picked up by a single person.

In a further aspect, a weighing apparatus in accordance with the present invention comprises a support for supporting an object thereon and a weighing sensor for determining a load applied by the object when the object is supported on the support, wherein the apparatus is arranged such that when the object is supported essentially all of the load applied by the object is transmitted through the weighing sensor.

In yet further aspect, a weighing apparatus in accordance with the present invention comprises a support for supporting an object thereon and a weighing sensor for determining a load applied by the object when the object is supported on the support, wherein the apparatus is arranged such that when the object is supported an essentially unidirectional force is applied to the weighing sensor and essentially all of the load applied by the object is transmitted through the weighing sensor.

In all aspects, the weighing apparatus in accordance with the present invention may be provided with a foot or base on which the weighing apparatus rests or stands during use. The foot or base may rotate about axes in at least two directions, typically a horizontal axis and a vertical axis. This allows the foot or the base of the weighing apparatus to sit on uneven or sloped terrain and yet still allow the weighing apparatus to load the weighing sensor in the intended direction and measure the weight only in the direction of gravity.

In one embodiment, the weighing apparatus is provided with a load guide bush and the load guide can swivel rotate in the load guide bush to allow relative rotation between the foot or base and the load guide.

In some embodiments, the foot or base is connected to the housing via a pivot pin or axle or one or more arms extending in a generally horizontal direction, the pivot pin or the axle or the one or more arms extending through or from or forming part of a member that is rotatable relative to the housing about a generally vertical axis.

In these aspects, the object may be lifted using any other lifting arrangement and the weighing apparatus positioned so that the object can be lowered and supported by the weighing apparatus. The weighing apparatus can then sense and determine the weight of the object.

The present invention also provides a method for determining the weight of an object, the method comprising providing a plurality of weighing apparatus as described herein, connecting each of the plurality of the weighing apparatus to the object, raising the object using the weighing apparatus, determining a weight carried by each of the weighing apparatus and determining a total weight of the object from the weight carried by each of weighing apparatus.

In another aspect, the present invention provides a method for determining a weight of an object, the method comprising raising the object, supporting the object on a plurality of weighing apparatus as described herein, determining a weight carried by each of the weighing apparatus and determining a total weight of the object weight carried by each of the weighing apparatus.

In one embodiment, the method comprises a method for determining the weight of a shipping container, the method comprising connecting a weighing apparatus to each corner of the shipping container, raising the shipping container using the weighing apparatus, determining a weight cab each of the weighing apparatus and determining a total weight of the shipping container from the weight carried by each of the weighing apparatus.

The method may also include determining a centre of gravity of the object shipping container.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Various embodiments of the invention will be described with reference to the following drawings, in which:

FIG. 1 shows a perspective view of a shipping container having a plurality of weighing apparatus connected thereto, with each weighing apparatus being connected to a corner of the shipping container. Although not shown in FIG. 1, there are four separate weighing units attached to the shipping container;

FIG. 2 shows a perspective view of a weighing apparatus in accordance with one embodiment of the present invention;

FIG. 3 shows a side cross sectional view of the weighing apparatus shown in FIG. 2;

FIG. 4 shows a cross sectional perspective view of the weighing apparatus shown in FIG. 2;

FIG. 5 shows an enlarged detail of the weighing apparatus shown in FIG. 2 being connected to the shipping container shown in FIG. 1;

FIG. 6 shows an enlarged view of the top of the weighing apparatus shown in FIG. 2, with the level bubble being clearly shown;

FIG. 7 shows a perspective view of a weighing unit in accordance with another embodiment of the present invention;

FIG. 8 shows a rear view of the weighing unit shown in FIG. 7;

FIG. 9 shows a cross sectional perspective view of the weighing apparatus shown in FIG. 7;

FIG. 10 shows a cross sectional side view taken along section line G-G shown in FIG. 8;

FIG. 11 shows an enlargement of detail H shown in FIG. 10;

FIG. 12 shows a perspective view of a weighing unit in accordance with another embodiment of the present invention;

FIG. 13 shows a rear view of the weighing unit shown in FIG. 12;

FIG. 14 shows a cross sectional perspective view of the weighing unit shown in FIG. 12;

FIG. 15 shows a cross sectional side view taken along section line G-G shown in FIG. 13;

FIG. 16 shows a perspective view of the weighing unit in accordance with a further embodiment of the present invention;

FIG. 17 shows a rear view of the weighing unit shown in FIG. 16;

FIG. 18 shows a cross sectional perspective view of the weighing unit shown in FIG. 16;

FIG. 19 shows a perspective side view taken along section line G-G shown in FIG. 17;

FIG. 20 shows a perspective view of the housing use in the weighing unit shown in FIG. 16 with some detail removed so that the linear housing guides can be clearly seen;

FIG. 21 shows a cross sectional plan view of the weighing unit shown in FIG. 16;

FIG. 22 shows a perspective view of a weighing unit in accordance with another embodiment of the present invention;

FIG. 23 shows a perspective cross sectional view of the weighing unit shown in FIG. 22;

FIG. 24 shows a cross sectional side view of the weighing unit shown in FIG. 22;

FIG. 25 shows details of the housing guide rails and the load guide rail slots used in the weighing apparatus shown in FIG. 22;

FIG. 26 shows a perspective view of weighing unit in accordance with another embodiment of the present invention;

FIG. 27 shows a perspective cross sectional view of the weighing unit shown in FIG. 26;

FIG. 28 shows a cross sectional side view of the weighing unit shown in FIG. 26;

FIG. 29 shows a perspective view of a weighing unit in accordance with another embodiment of the present invention;

FIG. 30 shows a cross sectional perspective view of the weighing unit shown in FIG. 29;

FIG. 31 shows a cross sectional side view of the weighing unit shown in FIG. 29;

FIG. 32 shows a perspective view of a weighing unit in accordance with another embodiment of the present invention;

FIG. 33 shows a cross sectional perspective view of the weighing unit shown in FIG. 32;

FIG. 34 Shows a Cross Sectional Side View of the Weighing Unit Shown in FIG. 32;

FIG. 35 shows an enlargement of detail C shown in FIG. 34;

FIG. 36 shows a perspective view of the weighing unit in accordance with a further embodiment of the present invention;

FIG. 37 shows a cross sectional perspective view of the weighing unit shown in FIG. 36;

FIG. 38 shows a cross sectional side view of the weighing unit shown in FIG. 36;

FIG. 39 shows an enlargement of detail C shown in FIG. 38;

FIG. 40 shows a perspective view of a weighing unit in accordance with another embodiment of the present invention. The weighing unit shown in FIG. 40 is lifted from above by use of the lift point;

FIG. 41 shows a cross sectional perspective view of the weighing unit shown in FIG. 40;

FIG. 42 shows a cross sectional side view of the weighing unit shown in FIG. 40;

FIG. 43 shows an exploded perspective view of a weighing apparatus in accordance with a further embodiment of the present invention;

FIG. 44 shows a cross sectional view of the assembled apparatus shown in FIG. 43;

FIG. 45 shows a detailed view of an embodiment of the present invention in which a preload is introduced onto the load cell;

FIG. 46 shows a cross sectional side view of the assembled apparatus incorporating the preload arrangement shown in FIG. 45

FIG. 48 shows a flow sheet showing use of the system outlining post the information and activity flow in a system for weighing an object in accordance with an embodiment of one aspect of the present invention;

FIGS. 49 to 51 together show a flow sheet of the information flow and steps involved in a system and a method for weighing a container in accordance with an embodiment of one aspect of the present invention;

FIG. 52 is a perspective view from below of a container weighing apparatus in accordance with another embodiment of the present invention;

FIG. 53 is a perspective view from below of the container weighing apparatus shown in FIG. 52 but with the foot being removed from the container weighing apparatus;

FIG. 54 is a cross sectional view of the container weighing apparatus shown in FIG. 53;

FIG. 55 is a rear view of the container weighing apparatus shown in FIG. 53;

FIG. 56 is a perspective view from above of the container weighing apparatus shown in FIG. 53;

FIG. 63 shows a perspective view of an alternative arrangement for guiding movement of the load cell, which may be used in an embodiment similar to that shown in FIGS. 43 and 44;

FIG. 64 shows the arrangement of FIG. 63 apart and in line for assembly;

FIG. 65 shows a side cross sectional view of the arrangement shown in FIG. 63; and FIG. 66 shows a side view of the arrangement shown in FIG. 63.

DESCRIPTION OF EMBODIMENTS

Figure 47:
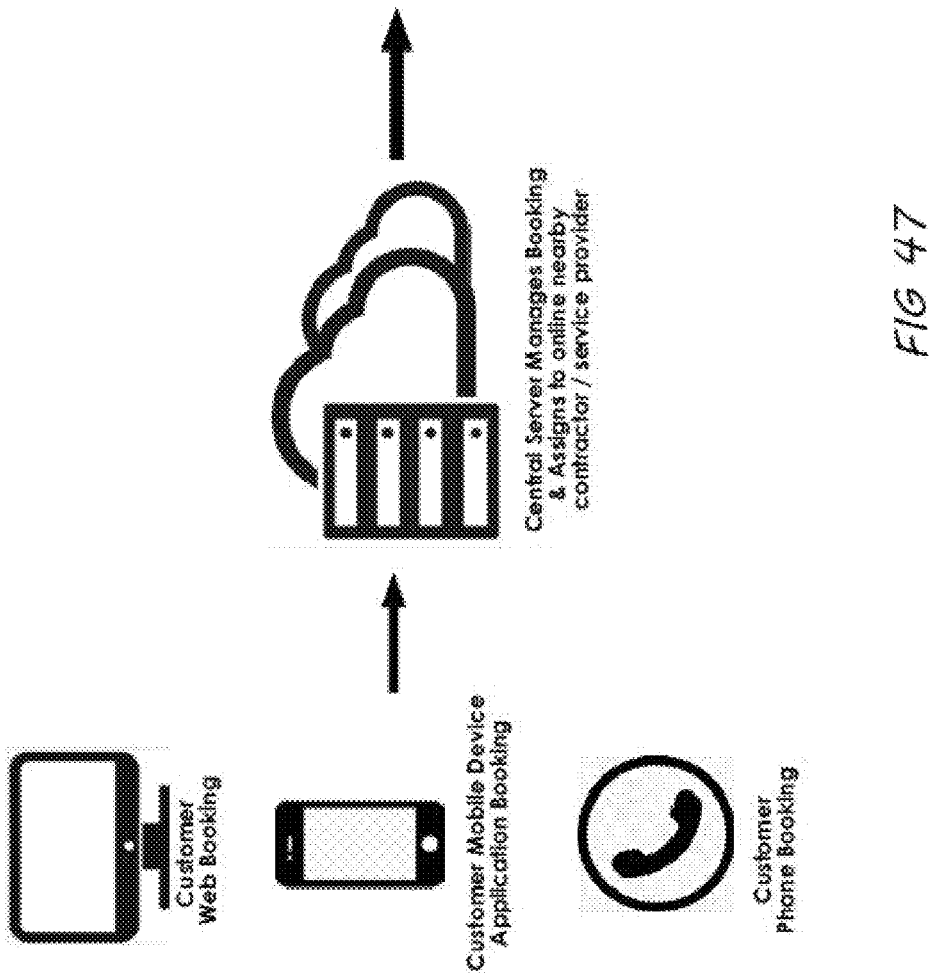
FIG. 47 shows a flow sheet showing use of the system for booking a weighing service in accordance with an embodiment of one aspect of the present invention.

The drawings have been provided for illustrating preferred embodiments of the present invention. Therefore, it will be understood that the present invention should not be considered to be limited solely to the features as shown in the attached drawings.

FIG. 1 shows a shipping container 10 of conventional construction. The shipping container 10 includes ISO corner connectors located at each corner of the container. One such connector is shown at 12. The corner connectors are of conventional construction and need not be described further, except to say that each corner connector has a connector opening on two adjacent sides of the corner connector. The shipping container also includes doors 14, 16 that are shown as being open in FIG. 1. However, it will be appreciated that the doors 14, 16 will normally be closed when the shipping container 10 is being weighed.

The shipping container shown in FIG. 1 also has four separate weighing apparatus in accordance with embodiments of the present invention connected thereto. Two of these weighing apparatus are shown at 18 and 20 in FIG. 1. Although not shown, similar weighing apparatus will also be connected to the other two corners of the shipping container 10. It can be seen from FIG. 1 that the weighing apparatus 18 is connected to one of the openings in the ISO corner connector of the shipping container. The other opening in that ISO shipping container remains open and it can be connected to a separate lifting device, if required.

FIGS. 2 to 6 show various views of the weighing apparatus 20 shown in FIG. 1. The weighing apparatus 20 is in accordance with one embodiment of the present invention. The weighing apparatus 20 includes a housing 22 that has a rear face 24. In use, the rear face 24 of the housing is located adjacent to the wall of the shipping container 10. The housing also includes opposed sidewalls, one of which is shown at 26. An opening 28 is formed in the side wall 26. A similar opening is formed in the other side wall (not shown). The housing 22 also includes a roof or top surface or top wall 30. A conventional ISO connector 32 is attached to the rear wall 24 of the housing 22. The housing 22 is made as a robust, strong housing that can bear the weight of the shipping container when the weighing apparatus 20 is used in conjunction with other weighing apparatus to lift or support the weight of the shipping container 10.

The top surface 30 of the housing 22 carries two opposed ears 34, 36. The ears 34, 36 have aligned holes 35, 37 (see FIG. 6) that can receive the shaft 38 of a leveling screw 40. Levelling screw 40 can be turned by wheel 42. As best shown in FIG. 6, the top surface 30 of the housing 22 also includes a level bubble 44 that can be used to indicate if the weighing apparatus 20 is properly level during use.

FIGS. 3 and 4 are cross sectional views that show the internal arrangement of the weighing apparatus 20. The weighing apparatus 20 includes a compression load cell 46. The compression load cell 46 may be of conventional construction and need not be described further. The compression load cell 46 has respective ends 48, 50. The upper end 48 rests in a downwardly extending cup 52 that is formed as a hollow open-ended cylindrical projection extending downwardly from a plate 54 that is bolted to the top surface 30 of the housing 22. Similarly, the lower end 50 of the load cell rests in an upwardly extending cup 56 that is formed as an upwardly extending open hollow cylindrical projection extending from a plate 58. Plate 58 is connected to a load arm 60.

The load arm 60 is used to ensure that an essentially vertical force is transferred through the compression load cell 46 when the weighing apparatus 20 is bearing the weight of the container. In order to achieve this, a pivot pin 62 is used to pivotally connect the load arm 60 to the housing. Pivot pin 62 passes through the opening 28 in sidewall 26 and also through the similar opening in the opposed sidewall of the housing. The load arm 60 includes a stop member 64 that is arranged such that it keeps the load arm 60 in a generally horizontal orientation when the load arm 60 is not loaded. The load arm 60 includes a load suspension region 66 has a domed lower end 68.

The weighing apparatus 20 also includes a front face 70 that holds an electronic display 72. The electronic display 72 may display the weight that is being measured by the weighing apparatus 20. The electronic display 72 may also display certain error messages if, for example, the weighing apparatus 20 is not properly level during use, or if batteries need changing, etc. The electronic display 72 may also include one or more input buttons to control the display and to control operation of the weighing apparatus 20. The electronic display 72 may form part of an electronic control box with display and telemetry broadcast and a digital level sensor. The telemetry may be used to wirelessly transmit data from the weighing apparatus to a computer, mobile telephone, personal digital assistant, tablet or the like. The front face 70 is arranged such that it does not come into contact with the load arm 60 when the load arm 60 is fully loaded by the weight of the shipping container.

In use of the apparatus shown in FIGS. 2 to 6, the apparatus 20 is connected to the shipping container by orienting the apparatus generally horizontal to the ground and inserting the ISO connector 32 into an opening of the ISO corner connector on the shipping container 10. The apparatus 20 is then rotated by 90° to lock the ISO connector 32 into the ISO corner casting. The leveling screw 40 is then operated by hand to ensure that the weighing apparatus 20 is level. In this regard, if the weighing apparatus 20 needs to have its upper end spaced further away from the container, the leveling screw 40 is turned so that it extends to the left (as shown in FIG. 3) until it comes into engagement with the side of the shipping container 10. Further extension of the leveling screw 40 pushes the top of the weighing apparatus 20 away from the side wall of the shipping container 10. Either the level bubble 44 or an electronic level may be used to determine when the apparatus is level.

The weighing apparatus that are connected to the other three corners of the shipping container (such as weighing apparatus 18 as shown in FIG. 1) are connected to the shipping container in a similar manner.

The weighing apparatus are then used to take the weight of the shipping container 10. This may be achieved in one of two different ways. In one method, a jack is positioned such that the jacking arm comes into contact with the domed lower end 68 of the load suspension region 66 of the load arm 60. The jack is then operated such that the jacking arm raises the weighing apparatus and, as a result, the shipping container that is connected via connector 32 to the weighing apparatus is also raised. In another embodiment, a separate lifting device is used to lift the shipping container 10 and a support is positioned under the domed lower end 68 of the load suspension region 66 of the load arm 60. The shipping container may then be lowered so that the support holds the shipping container above ground level in an elevated position. In this manner, the weight of the shipping container passes through the weighing apparatus attached to each corner of the shipping container.

It will be appreciated that when the plurality of weighing apparatus connected to the shipping container are bearing the weight of the shipping container, all of the weight of the shipping container will pass in an essentially vertical direction through the compression load cell 46. Essentially no horizontal component of force will pass through the compression load cell 46. This is achieved because the load arm 60 pivots about pivot point 62. When the weighing apparatus bears the weight applied by the shipping container, the load arm 60 is oriented in a horizontal position, thereby ensuring that the load cell 46 is perpendicular to the pivot arm 60. Further, the ends of the load cell 46 rest in cups 52, 56. The cups allow a degree of pivoting between the ends of the load cell 46 and the cups, thereby assisting in the load cell 46 remaining in a vertical orientation. They also prevent the transmission of any sideways force to the load cell, due to the domed ends having only a single point of contact. Finally, proper loading of the load cell is also assisted by use of the leveling devices to ensure that load cell is properly level. If any horizontal components of force are applied to the weighing apparatus 20 when the container is supported (for example, because the weighing apparatus 20 may not be properly level), those horizontal components of force pass through the pivot pin 62 and are borne by the housing 22. Thus, the horizontal components of force do not pass through the compression load cell 46, thereby minimising the likelihood of damage to the compression load cell.

FIGS. 7 to 11 show various views of a weighing apparatus 80 in accordance with another embodiment of the present invention. The weighing apparatus 80 includes a housing having a number of features that are common with the housing 22 shown in FIGS. 2 to 6. For convenience and brevity of discussion, these features will be referenced in FIGS. 8 to 11 using the same reference numerals as used in FIGS. 2 to 6. Further description of these features need not be given. Also, the housing 22 shown in FIGS. 8 to 11 omits the leveling screw 40 for clarity. Similarly, the electronic display 72 is not shown in FIGS. 8 to 11.

The weighing apparatus 80 shown in FIGS. 8 to 11 includes a compression load cell 82. The compression load cell 82 is of conventional construction and need not be described further. The compression load cell 82 has a lower end 84 and an upper end 86. The upper end 84 rests in an upwardly facing open cup 88 that is formed as part of or attached to a lower plate 90. The upper end 86 of the load cell 82 rests in a downwardly facing cup 92 that is attached to or formed as part of an upper plate 94. The upper plate 94 forms part of an outer guide 96. Outer guide 96 comprises a hollow, open bottomed guide that may be of any cross-sectional shape (such as circular, square, rectangular, triangular or indeed any shape that allows telescopic movement to occur). A lower part of the outer guide 96 is attached to the rear wall 24 of the housing 22 at 98. The upper part of the outer guide 96 is attached to the upper wall 30 of the housing.

The weighing apparatus 80 also includes an inner guide 100. Lower plate 90 forms part of the inner guide 100. The inner guide 100 may comprise an open topped hollow guide that is dimensioned such that it fits within the outer guide 96. The inner guide 100 suitably has a cross-sectional shape that is complementary to the cross-sectional shape of the outer guide 96. In order to assemble the weighing apparatus shown in FIGS. 8 to 11, the housing with the outer guide attached thereto is fitted with the compression load cell 82 and the inner guide 100 is inserted into the outer guide. Although not shown in FIGS. 8 to 11, stop members may be used to prevent the inner guide 100 from being removed from the outer guide once assembly has been completed.

The lower end of the inner guide 100 includes a load suspension point or region 102. The load suspension point or region forms an engagement region that engages with a lifting apparatus or a support or suspension arrangement when the container is being lifted or supported.

In use, 4 of the weighing apparatus 100 are provided with a single apparatus being attached to each corner of a shipping container. In one embodiment, a jacking arm is positioned such that it comes into contact with load suspension point or load suspension region 102 as the jack is used to raise the container. In another embodiment, a separate lifting apparatus (such as a crane) may be used to lift the container and appropriate supports positioned underneath the load suspension points or regions 102. The separate lifting apparatus may then lower the shipping container such that all the weight of the shipping container is borne by the supports positioned under the load suspension points or regions 102 of the weighing apparatus 80. In either case, the entire weight of the lifted or supported container is borne by the 4 weighing apparatus 80.

As the weight of the shipping container is taken up by the weighing apparatus 80, unrestricted telescopic movement between the inner guide 100 and the outer guide 96 can take place (that is, unrestricted along the length of the guides). As a result, a unidirectional force is passed through the load cell 82, thereby ensuring accurate measurement. Further, if there is any horizontal component of force applied due to the weighing apparatus or lifting/support not being level or aligned that horizontal component of load passes through attachment 98 and is borne by the housing and is not transferred to the load cell 82.

In some embodiments, a plurality of linear bearings 104, some of which are numbered in FIG. 10 and which are shown in more detail in FIG. 11, may be used. The linear bearings are located between the inner guide 100 and the outer guide 96.

FIGS. 12 to 15 show various views of a further embodiment of the present invention. The embodiment of the weighing apparatus 105 shown in FIGS. 12 to 15 is generally similar to the embodiment shown in FIGS. 8 to 11, except that the lower plate 90 of the inner guide 96 is replaced with a built in jack 106. The jack 106 may be a hydraulic jack and is operated by a handle 108. The jack 106 may have a lower end 110 that rests on a base or foot (not shown) to increase stability. Apart from those differences, the embodiment shown in FIGS. 12 to 15 is essentially identical to that as shown in FIGS. 8 to 11 and therefore similar reference numerals have been used to describe similar features.

FIGS. 16 to 21 show various views of a further embodiment of a weighing apparatus in accordance with the present invention. Where the features of the embodiment shown in FIGS. 16 to 21 are common with the features shown in the embodiment shown in FIGS. 2 to 6, like reference numerals will be used to denote like parts. The weighing apparatus 120 shown in FIGS. 16 to 21 includes a housing 22. FIG. 20 shows the opposed sidewalls 27 that opposes side wall 26. As also shown in FIG. 20, the housing 22 includes spaced guide rails 122, 124 mounted to the rear wall 24 of the housing 22. The weighing apparatus 120 has a built-in jack 126 that is operated by a handle 128. The jack has a lower end that includes a downwardly facing cup 130. The upper end 132 of a compression load cell 134 is positioned in cup 130. The lower end 136 of load cell 134 is positioned in an upwardly facing cup 138. Due to the shape and design of the ends of the load cell and the respective cups (which will be described in more detail hereunder) the load cell contacts the cups effectively at pivot points. In this manner, as load is applied to the ends of the load cell (for example, by lifting or supporting the weight of the shipping container), the load cell has a degree of float or self adjustment that enables it to remain essentially vertical and also to ensure that side loading of the load cell is avoided.

In embodiments of the present invention, it may be desirable that when a jack is used as the lifting apparatus when the weighing apparatus is placed on a support, that the jack arm or the support contacts the load suspension region or the engagement region such that there is essentially a single point of contact between the load suspension region or the engagement region and the jack or the support. In this manner, a sideways force is not transmitted to the load cell.

The weighing apparatus 120 includes an inner guide 140 that is formed as a downward extension of the jack 126. The weighing apparatus 120 also includes an outer guide 142. The outer guide 142 includes flanges 144 that have complementary shaped openings to the shape of the guide rails 122, 124. This is best shown in FIG. 21. In this manner, the outer guide 142 can reciprocally move relative to the housing 22.

In use, the connector 32 is connected to an ISO corner connector of the shipping container. The jack is operated which causes lower cup 130 to move downwardly. This, in turn, causes the outer guide 142 to move downwardly relative to the housing. Continued downward movement of the outer guide 142 causes the domed lower end 148 of the inner guide to contact the ground and further extension of the jack results in the weighing apparatus 120 starting to lift the shipping container off the ground. When this occurs, the weight of the shipping container that is borne by the weighing apparatus 120 passes through the compression load cell 134 in a manner such that side loading of the compression load cell 134 is avoided.

In the embodiment shown in FIGS. 12 to 21, the inner guide and outer guide may be of any suitable cross-section shape. The leveling device and electronic display has been omitted from these drawings for simplicity. In these embodiments, the load cell is shown as a compression type load cell. However, the design shown in FIGS. 12 to 21 also suits a shear pin load cell or measuring of hydraulic pressure between the inner guide and the outer guide to determine the load. Guide bearings may be an option but they are omitted from some of the figures for clarity. The leveling screw has also been omitted for clarity.

FIGS. 22 to 25 show various views of a weighing apparatus in accordance with another embodiment of the present invention. The embodiment shown in FIGS. 20 to 25 includes a housing that is generally similar to the housing shown in FIGS. 2 to 6 and, for convenience and brevity, like reference numerals will be used to denote like parts.

The weighing apparatus 150 shown in FIGS. 22 to 25 includes guide rails 152, 154 that are mounted to the rear wall 24 of the housing 22 (see FIG. 25). The guide rails are shown as comprising round guide rails for simplicity. However, it will be understood that the guide rails may be of any shape of a typical linear guide bearing or guide rail (and this applies to any embodiment of the present invention that uses similar guide rails). A guide member 156 having slots 158, 160 is mounted for reciprocal movement along guide rails 152, 154. The guide member 156 includes a lower wall 162. Lower wall 162 has an upwardly facing cup 164 that receives a lower end 168 of a compression load cell 166. The upper end 170 of the compression load cell 166 is received in a downwardly facing cup 172 that is formed with or attached to the upper wall 30 of the housing 22. As best shown in FIGS. 23 and 24, the lower wall 162 of the guide member 156 also includes a load suspension point or region 174.

In use of the weighing apparatus 150 the housing is connected to the ISO corner connector is as described with reference to the embodiment shown in FIGS. 2 to 6. The leveling screw is then used to level the weighing apparatus 150 (with the assistance of the leveling bubble or an electronic level incorporated into the electronics of the weighing apparatus 150). A jack may then be used such that the jacking arm contacts the load suspension point/region 174 to thereby lift the container. Alternatively, the container may be lifted by a separate lifting means and the support positioned under the load suspension point/region 174. The container may then be lowered such that the load suspension point/region 174 contacts the support so that the container is supported above the ground by the weighing apparatus 150 and the support. In either case, all of the weight of the container that is borne by the weighing apparatus 150 passes in a vertical direction through the load cell 166. The guided load slide ensures that the load cell is loaded in the correct and consistent orientation.

The load cell shown in the embodiment of FIGS. 22 to 25 is a compression load cell. However, this embodiment may also be used with a shear pin load cell or by use of measuring hydraulic pressure between the guides determine the load.

FIGS. 26 to 28 show a further embodiment of the weighing apparatus in accordance with the present invention. As with other embodiments, where features of this embodiment are similar to the features shown in FIGS. 2 to 6, like reference numerals will be used to denote like parts.

The weighing apparatus 180 shown in FIGS. 26 to 28 has a housing 22 that is generally similar to the housing shown in FIG. 1. Similarly, the weighing apparatus 180 includes a load arm 60 that is pivotally mounted to the housing 22 by a pivot pin 62. A stop member 64 is used to keep the load arm 60 in an essentially horizontal configuration. The load arm 60 has a load suspension region 66 that has a domed lower end 68.

In the weighing apparatus 180, a link arm 182 is connected by a pivot pin 184 to the load arm 60. The link arm is connected by another pivot pin 186 to the opposed sidewalls 26, 27 of the housing 22. The pivot pin 186 passes through opening 188 in a side wall 26 and through a similar aligned opening in opposed side wall 27 (not shown). Either or both of the link arm pivot pins 186, 188 may comprise shear pin load cells. In this manner, as the link arm is loaded by way of either lifting or supporting the weight of the shipping container through the load suspension region, the one or more shear pin load cells 186, 188 measure or determine the load applied thereto by the weight of the shipping container that is borne by the weighing apparatus 180. The load arm and related housing connection pin (pivot pin 186) ensures that the load measuring device is loaded in the required design direction regardless of the jacking force angle.

In another embodiment, rather than using shear pin load cells for one or both of pivot pins 186, 188, the link arm 182 may comprise a compression style load measuring device such as a hydraulic pressure chamber or a compression load cell.

FIGS. 29 to 31 show various views of a weighing apparatus in accordance with a further embodiment of the present invention. The weighing apparatus 190 shown in FIGS. 29 to 31 includes a housing having many features in common with the housing 22 shown in FIGS. 2 to 6. For convenience and brevity of description, the features of the housing in the embodiment shown in FIGS. 29 to 31 that are common with the features of the housing 22 shown in FIGS. 2 to 6 will be denoted by like reference numerals. No further description of these features need be given.

The apparatus shown in FIGS. 29 to 31 includes a generally upright arm 192 having a load support region 194 at a lower end thereof. Two spaced load arms 196, 198 are pivoted at points 197, 199 to the upright arm 192. The other ends of load arms 196, 198 are pivoted to the housing at pivot points 200, 201. Appropriate pivot pins may be used to achieve this pivoting connection. The load arms form a parallel linkage.

The weighing apparatus 190 further includes a link arm 202. Link arm 202 is pivoted at its lower end to the lower load arm 198. In particular, link arm 202 is pivoted at pivot point 204 to the lower link arm 198. The upper end of link arm 202 is pivoted to a bracket or downward extension 206 extending from the top wall 30 of the housing. A pivot pin 208 is used to achieve this pivotal connection.

In the embodiment shown in FIGS. 29 to 31, as the weight of the container is born through load support point/region 194, a force is applied through the link arm 202. One or more of the pivot pins located at 204 and 208 may comprise shear pin load cells and thus they may provide an indication of the weight being carried by the weighing unit 190. Alternatively, the link arm 202 may comprise a load measuring device such as a load cell or a hydraulic pressure cylinder. The link arm 202 may also be replaced by a hydraulic jack. If this was the case, the hydraulic jack would need to be extended to a set limit to ensure in the weighing position that the geometry on the load measuring device was the same each time.

FIGS. 32 to 35 show a weighing apparatus in accordance with a further embodiment of the present invention. The weighing apparatus shown in FIGS. 32 to 35 includes a housing that is generally similar to the housing shown in FIGS. 2 to 6 (with the leveling screw and level bubble omitted for clarity). For convenience and brevity of description, the features of the housing in FIGS. 32 to 35 that are in common with the housing shown in FIGS. 2 to 6 will be denoted by like reference numerals. These features need not be described further.

The weighing apparatus 210 shown in FIGS. 32 to 35 includes a pivoting arm 212 connected by a pivot pin 214 to the housing 22. The pivot pin 214 extends through aligned holes in the opposed sidewalls of the housing, with one of the holes 216 being shown in FIG. 32. The pivoting arm 212 is fitted with a pivot stop 218 which acts to hold the pivot arm in a generally horizontal orientation.

The pivot arm 218 is fitted with a load suspension point/region 220 that includes a domed lower surface 222. It will be appreciated that although FIG. 34 shows the load suspension point/region being formed as part of a separate component to the pivot arm, the load suspension point/region may be integrally formed with the pivot arm 212. In some embodiments, the load suspension point may be located closer to the rear wall 24 of the housing 22 for better loading ratios.

In order to measure load applied to the weighing apparatus 210, the housing is fitted with a shear beam load cell 224. Shear beam load cell 224 is attached to the top wall 30 of the housing by bolts 226, 228. The shear beam load cell 224 contacts an upward extension 230 attached to or formed with the pivoting arm 212 such that when the weighing apparatus 210 supports the weight of the container (through load suspension point/region 220), the weight of the container is applied in a unidirectional manner to the shear beam load cell 224 and the shear beam load cell 224 is an indication as to the weight of the container that is being borne by the weighing apparatus 210.

FIG. 35 shows an enlargement of Detail C shown in FIG. 34. The shear beam load cell 224 has a hole 232 drilled therein. An insert 234 is mounted in the hole. The insert 234 has a threaded blind bore 236 formed therein to enable the insert to be held in place by use of an appropriate screw (not shown). The insert has a downwardly extending portion 238. Downwardly extending portion 238 includes a domed lower surface 240. The end of the pivoting arm 212 has a hole that is fitted with an insert 242, the lower end of which forms the load suspension point/region 220. The insert 242 includes a threaded projection 244. A member 246 is connected to the threaded projection 244. Member 246 includes a recess 248 that forms a cup that receives the domed lower surface 240 of the insert 234. As can be seen from FIG. 35, there is a gap or space between the outer diameter of the lower portion of insert 234 and the inner walls of the recess 248. Due to the domed shape of the lower surface of the recess 234, there is a single domed contact point ensuring no side loading.

Accordingly, a unidirectional force is applied to the shear beam load cell when the weighing unit 210 carries the weight of the container.

FIGS. 36 to 39 show a further embodiment of a weighing apparatus in accordance with another embodiment of the present invention. The weighing apparatus 250 shown in FIGS. 36 to 39 has a number of features in common with the weighing apparatus shown in FIGS. 32 to 35. For convenience and brevity of description, like reference numerals are used to describe like features in these features will not be described further.

The weighing apparatus 250 also utilises a shear beam load cell 224 however, in this instance, the shear beam load cell 224 is mounted to the pivoting arm 212 by bolts 252, 254. A lower end that forms the load suspension point/region 256 that has a domed lower end 258. The end of the shear beam load cell 224 has an upwardly extending projection 260 that fits into a downwardly extending cup region 262 that is mounted to the top walls 30 of the housing 22. Further detail is shown in FIG. 39. Essentially, this detail is similar to that shown in FIG. 35 but with the projection having the domed surface extending upwardly rather than downwardly (as in FIG. 35). This also provides a single domed contact point ensuring no side loading. It will be understood that in the embodiment shown in FIGS. 34 to 39, the weighing apparatus is used to either lift or support the weight of the container through the load suspension point/region 220/258. The load suspension point/region 220/258 has a domed lower end and this also assists in avoiding side loading. It should be appreciated that all versions of compression load cell weighing devices can also be applied as a top lifted tension weight sensor versions. For convenience and brevity of description a tension version of the embodiment described in FIGS. 2 to 6 is outlined in FIGS. 40 to 42. It will be appreciated that the same differences applied between FIGS. 2 to 6 and 40 to 42 can also be applied to the other embodiments shown in FIGS. 7 to 39 to allow top lift or suspension and tension with tension weight sensors used.

FIGS. 40 to 42 show various views of a weighing apparatus in accordance with a further embodiment of the present invention. The weighing apparatus 270 shown in FIGS. 40 to 42 uses a load measuring device that determines load from tension.

The weighing apparatus 270 comprises a housing 272 having a rear wall 274, and an ISO connector 276 attached to the rear wall. The housing has two opposed side walls, one of which is shown at 278. Each of the opposed sidewalls includes aligned openings, one of which is shown at 280. A load pivot arm 282 is pivotally connected to the housing by virtue of a pivot pin 284 that passes through the opening 280 and the corresponding aligned opening in the other sidewall (not shown). The housing also includes a fixed floor 286.

The load pivot arm 282 has a lift point in the form of an eye 288 that is mounted to a connector 290 attached thereto. The eye 288 allows the weighing apparatus 270 to be lifted by a crane hook or similar.

A tension load measurement device 292 is connected at its top end 294 to the load pivot arm 282. The tension load measurement device 292 is connected at its lower end to the fixed floor 286. It will be appreciated that ears 298, 299 are affixed to the load pivot arm 282 and floor 286, respectively, and these enable the tension load measurement device 292 to be connected thereto by use of appropriate pivot pins (not shown).

In use of the weighing apparatus 270 shown in FIGS. 40 to 42, the ISO connector 276 is connected to the ISO corner connector of the shipping container. Four weighing apparatus 270 are used, with each weighing apparatus being connected to a respective corner of the shipping container. The eyes 288 are then attached to lifting hooks and the lifting hooks are used to lift the weighing apparatus 270 which, in turn, lifts the shipping container. Tension is applied in a unidirectional manner through the tension load measurement device 292, thereby giving an accurate reading of the weight being carried by each of the weighing apparatus 270.

FIGS. 43 and 44 show a perspective view of part and in line for assembly, and a cross sectional view of the assembled apparatus, of a weighing apparatus in accordance with yet a further embodiment of the present invention. The weighing apparatus 300 shown in FIGS. 43 and 44 is used to support the weight of a shipping container and to determine the weight of the shipping container that is being borne by that weighing apparatus.

The weighing apparatus 300 includes a container/load attachment portion 302 and a weighing portion 304. The container/load attachment portion 302 includes a heavy duty bracket 306 having a wall and opposed side flanges 308, 310. The side flanges 308, 310 each have a series of holes formed therein, with each of the holes in one flange being in alignment with a corresponding hole in the other flange. Some of these holes are numbered at 312 in FIG. 43. The container/load attachment portion 302 also includes an ISO connector 314. As can be seen, container/load attachment portion 302 has essentially no roof nor any part that can be lifted using a jack.

The weighing portion 304 includes a rear wall 316 and opposed sidewalls 318, 320. Each sidewall 318, 320 has a series of holes formed therein, with each of the holes in one sidewall being in alignment with a corresponding hole in the other sidewall. Some of these holes are numbered at 322 in FIG. 43. A foot 323 provides a base for the weighing portion 304.

The weighing apparatus 300 is also provided with a connection pin 324.

Turning now to FIG. 44, the weighing portion 304 is fitted with a guide block 326. The guide block may be bolted or otherwise mounted to the opposed sidewalls of the weighing portion 304. A guide bush 328, which may be in the form of a low friction bush, is mounted in an opening through the guide block 326. A load guide 330, which may comprise a solid block or rod of metal, extends through the guide bush 328. The lower end of load guide 330 extends downwardly and into the foot 323. The weighing portion 304 is also provided with a top load cell support 332. The top load cell support 332 may also be attached to the sidewalls of the weighing portion 304. A load cell 334 is fitted inside the weighing portion 304. The load cell 334 may be a compression load cell. An upper end 336 of the load cell 334 is fitted inside a downwardly extending cupped region 338 of the top load cell support. The lower end 340 of the load cell 334 is fitted into an upwardly extending cupped region 342 that is formed in an upper part of the load guide 330. The respective ends of the load cell may have domed end surfaces so that side loads are not transmitted to the load cell.

In use of the weighing apparatus 300 shown in FIGS. 43 and 44, the container/load cell attachment portion 302 to is attached to the ISO corner connector of a shipping container. It will be appreciated that there will be four separate weighing apparatus 300 used to determine the weight of a shipping container, with each corner of the shipping container being fitted with one of the weighing apparatus. Once the container/load attachment portions 302 have been attached to the shipping container, the container is lifted by a separate lifting device, such as a crane or separate jack-based lifters that are attached to the other openings in each ISO corner connector on the shipping container. The weighing portions 304 may then be positioned such that the rear wall 316 of the weighing portion 304 comes into close proximity or abutment with the wall 306 of the container/load attachment portion 302. When the shipping container has been raised to a level at which the shipping container is off the ground and one aligned pair of the holes 312 in the flanges of the attachment portion 302 have come into alignment with one pair of aligned holes 322 in the sidewalls of the weighing portion 304, the pin 324 is passed through the aligned holes. This acts to connect the weighing portion 304 to the container/load attachment portion 302. In this embodiment there is a pitch difference between holes 312 and 322 allowing fine height adjustment between attachment portion 302 and weighing portion 304. This difference in pitch allows a set of holes to align in 302 and 304 in increments of the difference in pitch. This allows the weighing devices to carry the weight of the container evenly regardless of the ground support height on foot 323.

The lifting apparatus may then be lowered such that the weight of the container is borne by the weighing apparatus 300 that are connected to each corner. This results in the weight of the shipping container that is being borne by each of the weighing apparatus passing through the load cell 334. Due to the arrangement of the load guide 330 and the top load cell supports 332, no side loading of the load cell occurs and essentially all of the weight of the load is transmitted accurately in the direction of gravity to the load cell in the intended axis of application regardless of external influence of terrain or reaction force support direction on foot 323 or load guide 330. Once the shipping container has been weighed, the separate lifting apparatus may be used to take the load off the weighing apparatus, the pin 324 removed and the container lowered to the ground.

It will also be appreciated that the arrangements of the load cells or weighing means shown in the embodiments described with reference to FIGS. 2 to 39 may also be used in the embodiment shown in FIG. 44.

It will also be appreciated that this device may be used with a tension load cell in a top lift/support application by swapping & rotating 180 degrees support 332 with 326, 328 and 330 and using a hook or eye in place of 323.

In another modification to the weighing apparatus shown in FIGS. 43 and 44, the weighing portion 304 may have the ISO connector 314 attached thereto and the weighing portion 304 may be connected to the corner connector is of the shipping container and the weighing portion moved to the essentially vertical orientation shown in FIG. 44 once the shipping container has been lifted off the ground. The shipping container may then be lowered so that it is fully supported by the feet of the weighing apparatus attached to each corner.

The weighing apparatus in accordance with the present invention may be provided with electronics and telemetry and/or wireless communications systems such that data relating to the weight being measured by the weighing apparatus is transmitted to a computer, or to a tablet computer, or to a mobile telephone or to a personal digital assistant or the like. These devices may have one or more data recording means, such as a database, that records the weight of the container. The weight of the container may be determined by adding the weight being borne by each of the weighing apparatus that is connected to the container. These devices may also include identifiers relating to the particular shipping container, such as a container number, so that the weight of the container may be recorded against that container identifier. It may be possible to provide a printout of the weight of the container with details as to the container identifier also be provided on the printout. That printout may then be attached to an exterior wall of the container. It is also possible to determine the centre of gravity of the container from the weights being measured by the weighing apparatus at each corner of the container. The skilled person will readily understand that there may be a number of different algorithms it can be used to determine the weight of the container. Further, the data recording means may also record other details, such as the date that the weight was measured, the name of the individual or company that conducted the weight measurement, and the location of the centre of gravity of the container.

FIGS. 45 and 46 show a further embodiment of the present invention. The embodiment shown in FIGS. 45 and 46 is similar to that shown in FIGS. 43 and 44 and, for convenience, like reference numerals will be used to refer to like features. Although not shown in FIGS. 45 and 46, the weighing portion 304 and the container attachment portion 302 are generally identical to those features as shown in FIG. 43.

The embodiment shown in FIGS. 45 and 46 is arranged such that a pre-load is applied to the load cell 334. In particular, a preload spring cap 380 is positioned attached by thread or other means to load guide 330 such that it forces load guide 330 to bear upon the load cells 334 in the intended loaded direction. The guide block 326 has a shoulder 381 that faces a shoulder formed on the preload spring cap 380. A preload spring 382, in the form of a compression spring, bears upon the opposed shoulders on the guide block 326 and the preload spring cap 380. In this manner, the preload spring 282 applies a preload force to the load guide 330 in turn applying that load in the intended axis of operation to load cell 334. It will be appreciated that a plurality of preload spring 282 may be used. Further, the preload springs may be replaced by cone washers, compression washers, rubber bushes or rubber rings, hydraulic cylinders, pneumatic cylinders, expandable devices that may be expanded by increasing internal pressure (such as air pressure or hydraulic pressure) or the like. Applying a preload to the load cell 334 is expected to increase the accuracy of weighing of the container.

The embodiments of the weighing unit shown in FIGS. 2 to 39 relate to lifting devices in which the weighing unit is raised by a lifting mechanism that pushes upwardly on the weighing unit. The lifting mechanism does this through the load suspension point, also referred to as the jack pivot point in some figures. The embodiment of the weighing unit shown in FIGS. 40 to 42 is a weighing unit that is raised by lifting the weighing unit from the lift point shown in FIG. 42. It will be appreciated that the mechanisms shown and described with reference to FIGS. 2 to 39 for loading the load cell may also be used in the weighing unit shown in FIGS. 40 to 42.

It will also be understood that the apparatus shown in FIGS. 2 to 39 may be used by lifting the container using a separate lifting mechanism and subsequently lowering the container so that the container is suspended through the load suspension points (also labelled as jack pivot points) of the weighing apparatus. The load suspension points or jack pivot points form the engagement region.

The weighing units in accordance with the present invention are suitably portable units that can be easily moved from site to site. The weighing units will preferably each way less then 40 kg, preferably each way less than 30 kg, preferably each way between 15 to 25 kg, typically about 20 kg. This allows the weighing units to be easily moved by one or 2 persons. Special apparatus to move and transport the weighing units is not required.

FIGS. 47 to 51 show information flows and some of the steps involved in weighing a container using a system and method in accordance with an embodiment of one aspect of the present invention. The system comprises software, in the form of an app, web portal or other conventional user interface that is loaded onto a computer or mobile device of the user. The system also includes software, in the form of an app, web portal or other conventional user interface that is loaded onto a computer or mobile device of a service provider who actually weighs the shipping container. It should be appreciated that a central database or computer with governing software may manage the data submitted and received via the network from each of the user/s and service provider/s for weight data processing and/or booking management. It should be appreciated that there may be one or many users and one or many service providers accessing the central database at any one time and the governing software will be managing the requests and data of one or many users and one or many service providers at any one time. It should also be appreciated that the weighing devices can be equipped to communicate directly with the central database or computer with governing software or relayed via the service provider computer or mobile device.

In FIG. 47, the steps involved in a customer making a booking for a service provider to come to weigh one or more shipping containers is shown. Initially, the customer will download appropriate software, such as an app, or access a web portal or other conventional user interface onto his mobile device or computer. The customer will then sign up or register using the software, app, web portal or other conventional user interface In particular, the customer will provide their name, email address, contact information (including telephone numbers and addresses) and a password. The customer may be required to enter in credit card details at registration or alternatively open a financial account at registration from which fees can be drawn for payment. Typically, once the user has submitted his sign up or registration details, those details will be sent to a server and the server will send an activation message, typically an activation email, to the client. After the user clicks the link in the activation message, the account will be active and ready for use. Typical functionality for registration, including forgotten password prompts, the ability to change passwords, etc, can be built into the system.

When the customer wishes to have one or more shipping containers weighed, the customer will send a booking request using the programme, such as by using an app or web portal. The customer will open the app on their mobile phone or computer and click on the tab "make a booking". The customer may select the priority to be assigned to the weighing service. For example, a customer may have a requirement for just a regular priority or an urgent priority. Jobs that are booked under an urgent priority may incur a higher cost. For example, a multiplier of the regular rate may be applied to an urgent job. The customer can also enter the number of containers to be weighed, and the location at which the weighing services are to be conducted. The customer may either enter the location or utilise the location services built into the customer's phone or computer. The customer may also add in information relating to the shipping company or transport company if they are booking on behalf of a third party. The customer may also enter a preferred date for the job.

Once all details necessary to book a container weighing job have been completed by the customer, the app sends the order information to a central server and central server issues and "order confirmed" notification back to the customer.

When the central server receives a job order from a customer, the central server will assign the job to a service provider. In one embodiment, the service provider comprises one of one or a number of contractors who have signed up to be service providers using the system. The contractor/s will also download an app to their computer or mobile phone. The contractor will then register in the system using his computer or mobile phone. The contractor will purchase or lease or be issued a conditional license for use of the portable weighing units as described herein in this specification. Details of the portable weighing units in the possession of each contractor will be recorded in the system, typically on a central server. Contractors may need to go through an approval process before they can be registered as contractors on the system. The approval process may involve checking that the contractors have access to the weighing units, appropriately trained staff to use the weighing units, appropriate lifting apparatus to raise the container onto the weighing units, appropriate staff numbers to handle the expected volume of work, etc. A number of different contractors may be registered in the system.

When a customer enters an order request, the order request will be forwarded to one or more contractors that service the location of the user. A contractor will receive a message from the central server advising that an order request has been made. The contractor may accept or decline that order request. If a contractor accepts the order request, the central server receives notification of acceptance and sends a "job scheduled" notification to the customer.

Figure 49:
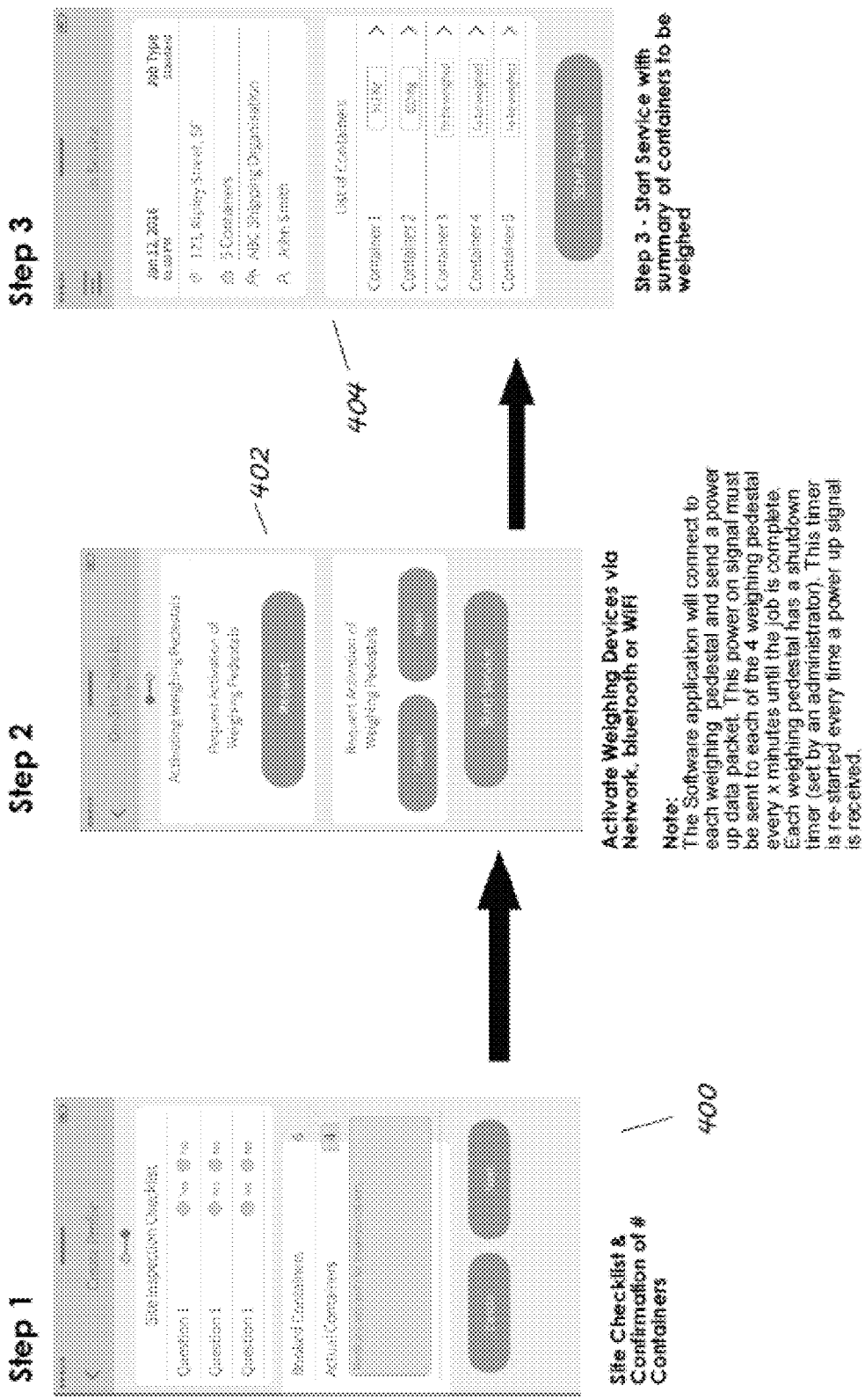

FIGS. 49 to 51 show a flowsheet outlining the steps that take place when the contractor arrives at the site at which the containers are located. The contractor transports the portable weighing units (typically, a set of 4 weighing units is used) to the site. Upon arriving at the site, the contractor goes through a site checklist and confirmation of the number of containers to be weighed. This is shown at reference numeral 400. The checklist may include confirmation that the number of containers that are booked in to be weighed matches with the number of containers on site.

The contractor will then use the app to activate the weighing units (referred to in FIG. 49 as "weighing pedestals"). The phone app can connect to each weighing unit and send a power up data packet (402). This power up signal may be sent to each of the 4 weighing units every 2 minutes until the job is complete. Each weighing unit has a shutdown timer that is restarted every time a power up signal is received. The weighing units send a message back to the app confirming that they have been powered up. Weighing of the containers may then start, for example, by lifting the containers, connecting them to the weighing units and then lowering the container so that the weighing units carry the weight of the container.

Upon clicking "start service", the contractor is navigated to the next phase of the weighing process. The next phase may involve a checklist that needs to be confirmed to input readings relevant to each container that is being weighed. The steps include recording the container ID, taking a picture of the container ID, recording the gross mass weight marked on the containers safety plate, taking a photo of the safety approval plate, recording container tare mass, taking a photo of the container door to record the container tare mass, install container door seals and scanning the seals (which can also assist in automatically updating seal inventory), photograph the weight verification door seals, place the weighing units in the right positions and take a photograph as an example, confirm that the container is complete suspended by the weighing units, take a photograph of the entire suspended container.

Once the above steps have been completed, the app may show a screen which allows the contractor to undertake the steps of pairing each weighing units with the phone (this may be done automatically by the app), take respective weight readings twice (and if the readings are within 25 kg or an acceptable value set by the platform/software administrator, a confirmed accurate reading is recorded). The contractor reviews the data and accepts the results or re-reads or re-weighs the container. Once the data is accepted, the software can then carry out the appropriate weight calculations to provide output data, which may comprise the gross weight of the container, the weight of the load carried within the container and the centre of gravity of the load. The weight may be displayed graphically on the screen. The weight data and the container identification data may then be sent to the customer and/or to a third party, such as a shipping company or transport company. The next container may then be weighed using a similar process.

Turning now to FIG. 49, the site checklist and confirmation screen are shown at 400. The screen to activate the weighing units is shown at 402 and a summary of the containers to be weighed is shown at 404. FIG. 50 shows screen 406 that enables input of the container identification number (by either operator input by scanning) and other data relating to the steps involved in suspending the container on the weighing units and weighing the container. Screenshot 408 shows a display of the gross weight of the container and the calculated centre of gravity, as well as the loading at the respective ends and sides of the container. This weight and weight distribution is calculated by the app from the individual weighing data received from each of the 4 weighing units that are used to suspend the container.

Screenshot 410 shows another screen that appears once one or more (FIG. 410 example shows specifically two) of the containers has been weighed. The contractor is able to continue to continue through each container or pause or cancel the booking. At the end of each container weighing, there may also be a checklist to ensure that container weighing is complete. Screenshot 412 shown in FIG. 51 relates to data being gathered on each individual container whilst screenshot 414 is shown once all containers have been weighed. When the contractor's mobile device has a data connection, the data from the weighing service and weighing process is uploaded to the central server for billing and for the final weight certificate to be sent to the customer. Weighing information may also be sent to a shipping company or port authority.

FIG. 48 shows the post weighing service actions that take place. In particular, once the central server receives notification that a weighing service has been completed, the central server charges or invoices the customer. The weighing results are delivered in digital format to the customer and/or to a shipping company or transport company. The weighing data may be presented to or injected into a third-party database such a support authority or freight forwarder. The contractor is also paid for the service or their account credited for batch payment.

The system described with reference to FIGS. 47 to 51 allows for simple booking of a weighing service by a customer. The system includes an app that may be downloaded onto a mobile phone or other mobile device and that takes the operator conducting the weighing process through the steps required to properly weigh a container in a step-by-step manner. The app receives data from each of the weighing units that are used to suspend the container and the app can then calculate the total weight of the container and the weight distribution in the container. The app may also determine the tare weight of the container.

FIGS. 52 to 56 show various views of a container weighing apparatus in accordance with a further embodiment of the present invention. The apparatus shown in FIGS. 52 to 56 is generally similar to the apparatus shown in FIGS. 43 and 44 and those similar features will not be described in further detail.

In the apparatus 500 shown in FIGS. 52 to 56, the housing 502 has a foot 504 mounted thereto. The foot 504 can rotate relative to the housing about a generally vertical axis. The foot 504 can also rotate about a generally horizontal axis 506. In that way, the foot can rotate in two different directions, thereby allowing the foot 504 to readily adapt to the slope or angle of the terrain upon which it rests.

As best shown in FIGS. 53 and 54, a load guide 508 extends from the housing. The load guide 508 at its upper end supports the load cell 510. The load guide 508 can rotate relative to the housing 502. For example, the load guide 508 may be mounted inside a bushing 512 which enables the load guide to rotate. The bushing 512 may be a nylon, brass, bronze, composite or any suitable material or other bearing or guide. The lower end of the load guide 508 includes generally horizontally extending arms 514, 516 (see FIG. 53). Ears 518, 520 can be connected to the horizontally extending arms 514, 516 such that the foot 504 becomes mounted to the horizontal arms 514, 516 and the foot 504 can rotate about horizontal axis 506. Thus, the foot 504 can rotate about horizontal axis 506 and also rotate about a vertical axis shown in FIG. 54 at 522. This enables the foot to sit on uneven or sloped terrain yet still allow the load cell to be loaded in the intended direction such that it measures the weight only in the direction of gravity.

The housing 502 further includes a level adjustment mechanism 530. This mechanism is located towards an upper end of the housing. This mechanism comprises a pin 532 having an engagement plate 534 mounted thereto. As can be seen from FIG. 54, the rear of the engagement plate 534 has a socket 536 formed thereon and this engages with a rounded end 538 on the pin 532 such that the engagement plate 534 is mounted to the pin 532 by a ball and socket joint. This allows the engagement plate 534 freedom to rotate in several directions. Therefore, even if the weighing apparatus 500 is used to support a container on quite uneven ground, the engagement plate 534 can sit flush on the side wall of the container to assist in properly orienting the housing relative to the container.

Figure 57:
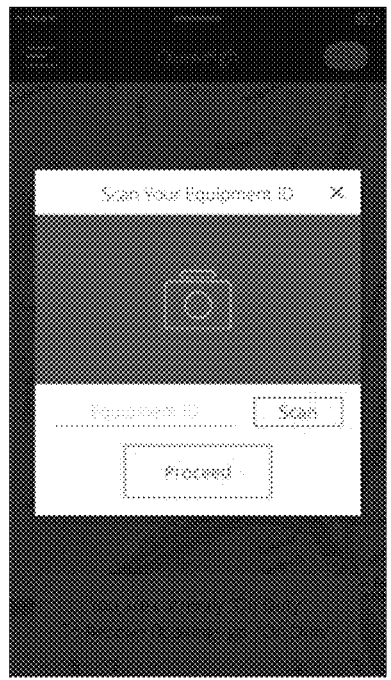
FIG. 57 shows a screenshot of part of the commencement process of a weighing operation in which a set of calibrated weighing units are used.
Figure 58:
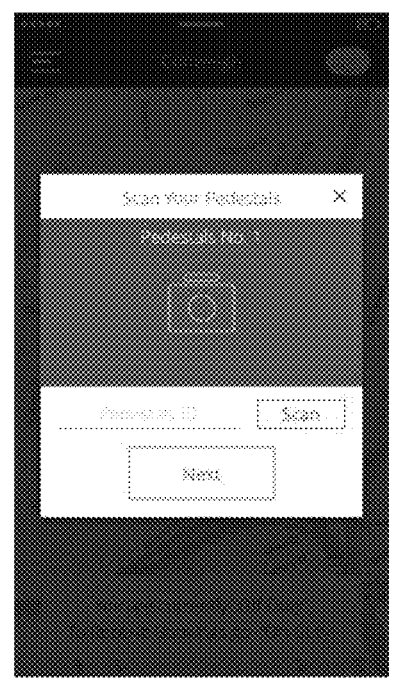
FIG. 58 shows a screenshot of a next step in the weighing operation having a commencement step as shown in FIG. 57.
Figure 59:
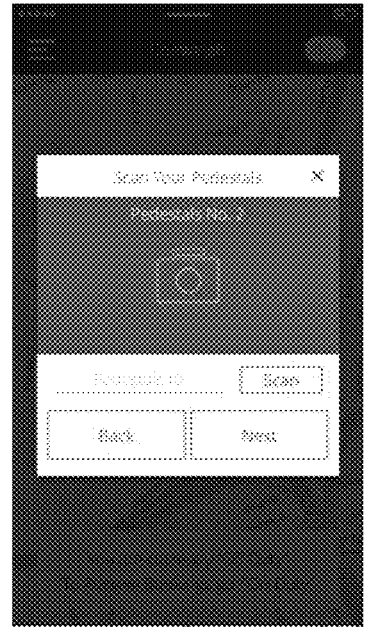
FIG. 59 shows a screenshot of a next step in the weighing operation having a commencement step as shown in FIGS. 57 and 58.

FIGS. 57 to 59 show screenshots and the steps involved in commencing a weighing operation in accordance with a further embodiment of the present invention. The embodiment shown in FIGS. 57 to 59 may be included as additional steps in the system and method as shown in FIGS. 47 to 51. In this embodiment, a set of 4 weighing units are calibrated and registered as a set of calibrated weighing units. In order to register the calibrated weighing units as a set, the serial number or other unique identifier for each weighing unit is recorded against a set identifier, such as a set identification number. These details are recorded in the database. The computer software includes functionality that only allows a weighing operation to be commenced if each of the 4 weighing units being used is a registered as a set of calibrated weighing units in the database.

In this regard, the initial steps of the weighing operation may involve the operator logging into the system and scanning or otherwise reading or entering the set identification number and the serial number or other unique identifier for each of the 4 weighing units. This may be achieved by each of the weighing units having a readable code placed on them (such as a barcode or a QR code), with the readable code including details as to the set identification number. Each of the weighing units connects wirelessly to the device onto which the software is loaded (typically, a smart mobile phone or other mobile device of the contractor). In one embodiment, the weighing units connect to the device by Bluetooth and each serial number is linked to a unique Bluetooth mac address. When the contractor logs in, he/she scans the equipment ID and the software then compares the equipment ID against the weighing unit identifier or serial number from the Bluetooth mac address and either confirms that the 4 weighing units belong in that set or rejects the four weighing units as not being part of a registered set. In this manner, the system in the method confirms that all weighing units belong together as a set. If they do not, the weight cannot be read.

In this embodiment, the system also establishes what weighing units should be read via Bluetooth (arising from the known hardware addresses for each of the weighing units in the set) in the event that there are multiple sets within range.

Therefore, this embodiment provides an app that has functionality to only take readings from registered sets of weighing units.

FIG. 57 shows a screen that comes up prompting the operator to scan the equipment ID. This is the set identifier. The operator presses the scan button and scans the relevant barcode or QR code. Once that has been done, the operator presses "proceed". This then brings up the screen shown in FIG. 58. This screen prompts the operator to scan the first pedestal/weighing unit. Once that is done, the screen shown in FIG. 59 comes up, which prompts the operator to scan the second pedestal/weighing unit. This continues until all weighing units in the set have been scanned. The app then compares the set identifier with the serial numbers of the weighing units. If the app confirms that the weighing units form part of the set, the weighing operation may continue. If the weighing units are not part of the registered set, an error message or a stop message is received.

FIGS. 60 to 63 show various views of an arrangement that may be used in a weighing unit similar to that shown in FIGS. 43 and 44. The arrangement shown in FIGS. 60 to 62 includes a load cell 734 having an upper end 738 and a lower end 740. A load guide 730 has a cup in its upper end which receives the lower end 740 of the load cell 734. The lower end of load guide 730 will be received in foot 323 of the weighing unit 304 shown in FIGS. 43 and 44.

The load guide 736 passes through an opening 327 in guide block 726. Load block 726 corresponds to guide blocks 326 shown in FIG. 44. The opening 327 includes bearing races, some of which are numbered at 329. Similarly, the outer side wall of load guide 730 is also provided with bearing races, some of which are numbered at 731. Ball bearings, some of which are numbered at 732 are located in and between the races 329, 731. The ball bearings form a bearing joint between the load guide 730 and the guide block 726. The ball bearings allow side loads to be absorbed and not transmitted to the load cell whilst also allowing vertical forces only to be transmitted to the load cell.

Figure 62:
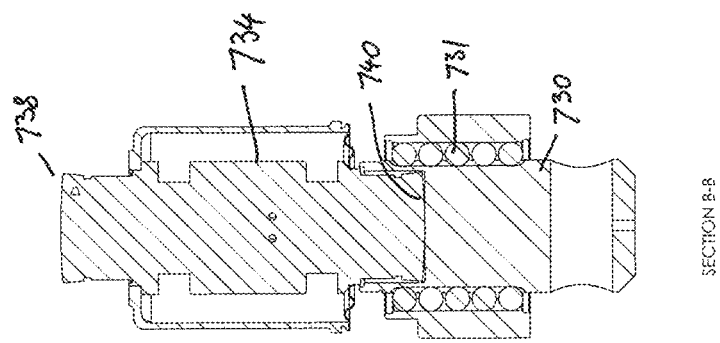
FIG. 62 that shows a cross sectional view of the arrangement shown in FIG. 60.
Figure 60:
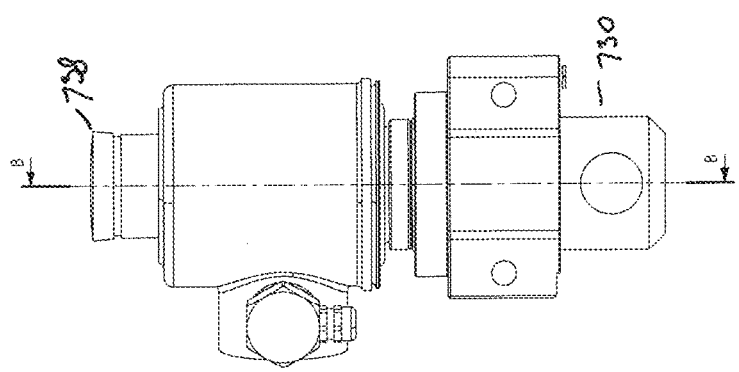
FIG. 60 shows a side view of an alternative arrangement for guiding movement of the load cell, which may be used in an embodiment similar to that shown in FIGS. 43 and 44.
Figure 61:
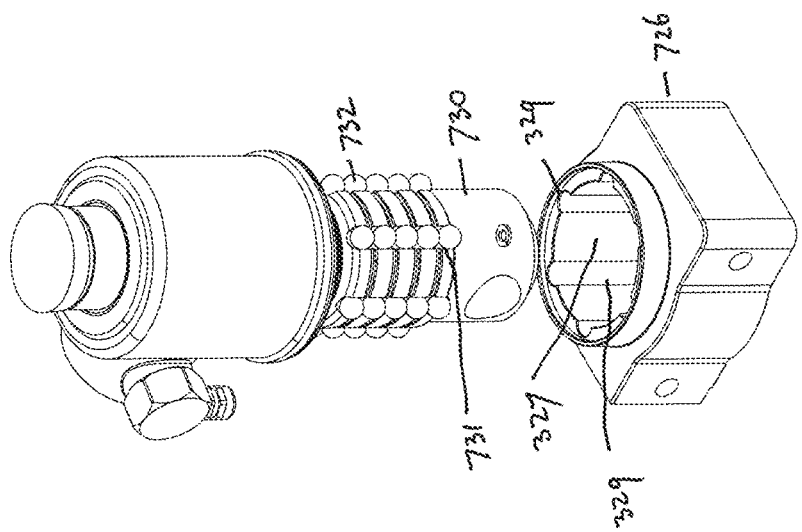
FIG. 61 shows the arrangement of FIG. 60 apart and in line for assembly.

FIGS. 63 to 66 show various views of another arrangement that may be used in place of the arrangement shown in FIGS. 60 to 62. The arrangement shown in FIGS. 63 to 66 includes a load cell 834 having an upper end 838 and a lower end 840. The lower end 840 is located in a cup formed in a guide block 826. Guide block 826 includes a passage 827 through which the load guide 830 extends. A plate 850 having an opening 852 and a plurality of spring fingers 854 surrounding the opening is positioned on top of the guide block 830. A similar plate 856 is located at the lower end of guide block 826. The arrangement shown in FIGS. 63 to 66 is also used in the housing arrangement shown in FIGS. 43 and 44. When a load is applied, the spring fingers prevent side loads being transmitted to the load cell. However, longitudinal/vertical loads are transmitted by deflection of the fingers at the top and bottom of the load guide 830. The fingers deflect in a linear manner according to the load applied and calibration of the load cell can mean that accurate measurement is possible.

It will be appreciated that in this embodiment, other ways of reading the set identifier and the weighing unit identifiers may be used. For example, the operator may simply enter the identifier into the device by hand. Alternatively, RFID tags or other contactless identification means may be used. It will also be appreciated that connection between the device and the weighing units may be achieved by methods other than Bluetooth. However, wireless techniques are preferred. It will also be understood that a set may not necessarily comprise 4 weighing units and that a set may have a different number of weighing units.

In some embodiments, the pin 532 may be movable towards and away from the container in order to further adjust the orientation of the housing relative to the container.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. An apparatus for determining a weight of an object, the apparatus comprising a bracket having a connector for connecting the bracket to the object, the bracket including opposed side surfaces having a plurality of aligned holes formed therein, the apparatus further comprising a housing having opposed side surfaces, the opposed side surfaces having a plurality of aligned holes formed therein, the housing resting on a base, wherein the housing is connected to the bracket by use of one or more pins or other connectors such that when the bracket is connected to the object and the housing is connected to the bracket the object is supported in a raised position and the weight of the object connected to the bracket passes through the housing and through the base, and the apparatus further comprising a weighing sensor for determining a load applied by the object when the object has been lifted or supported, wherein the apparatus is arranged such that when the object is lifted or supported an essentially unidirectional force is applied to the weighing sensor, or such that essentially all of the load applied by the object is transmitted through the weighing sensor, or such that when the object is lifted or supported an essentially unidirectional force is applied to the weighing sensor and such that essentially all of the load applied by the object is transmitted through the weighing sensor, wherein the object comprises a shipping container and the connector comprises an ISO connector to connect to an ISO corner connector on a shipping container.

2. An apparatus as claimed in claim 1 wherein the weighing sensor is arranged such that a unidirectional force and/or all of the weight of the container passes through the weighing sensor.

3. An apparatus as claimed in claim 1 wherein the weighing sensor comprises a hydraulic pressure sensor, an electrical actuator, a physical deflection monitor, a video extensometer, or digital image correlation, a speckle shearing interferometry device, one or more electrical strain gauges, a mechanical deflectometer, a visual or video deflectometer, a wave deflectometer or a frequency deflectometer.

4. An apparatus as claimed in claim 1 wherein the housing is provided with a level indicator and/or an electronic or analogue display that can display the load determined by the weighing sensor.

5. An apparatus as claimed in claim 1 wherein the apparatus comprises a portable apparatus.

6. An apparatus as claimed in claim 1 further comprising a foot on which the apparatus rests or stands during use.

7. A system for determining the weight of an object, the system comprising a plurality of apparatus as claimed in claim 1, the system further comprising a weight calculator, wherein each apparatus sends a signal indicative of a weight determined by the weighing sensor to the weight calculator, the weight calculator determining a total weight of the load from the signals received from each apparatus.

8. An apparatus as claimed in claim 1 wherein the essentially unidirectional force applied to the weighing sensor comprises an essentially vertical force.

9. An apparatus as claimed in claim 1 wherein the ISO connector comprises a twist lock connector or the ISO connector cannot move relative to the bracket and the bracket can be rotated by 90° to connect the ISO connector to an ISO corner connector on a shipping container.

10. An apparatus as claimed in claim 1 wherein the weighing sensor comprises a load cell.

11. An apparatus as claimed in claim 10 wherein the load cell comprises a compression load cell, a bending load cell, a tension load cell, a shear pin load cell, a shear beam load cell, a beam load cells, a ring torsion load cell, a single point load cell, a canister load cell, a plate load cell or a force load cell.

12. An apparatus as claimed in claim 10 wherein the load cell has an upper end and a lower end, the lower end being located in a cup formed in a guide block, the guide block including a passage through which the load guide extends, a plate having an opening and a plurality of spring fingers surrounding the opening being positioned on top of the guide block, a further plate having an opening and a plurality of spring fingers surrounding the opening being located at a lower end of guide block, wherein when a load is applied, the spring fingers prevent side loads being transmitted to the load cell but longitudinal or vertical loads are transmitted by deflection of the fingers at the top and bottom of the load guide.

13. An apparatus as claimed in claim 10 wherein a pre-load is applied to the load cell.

14. An apparatus as claimed in claim 1 wherein the housing is provided with a levelling device to enable the housing to be levelled.

15. An apparatus as claimed in claim 14 wherein the levelling device comprises a levelling screw that can be turned to engage with the object to thereby enable the apparatus to be levelled, or a hydraulic jack to provide a required force to hold the housing in the correct position relative to the object to ensure only force in the direction of gravity is measured, or the levelling device is provided with an engagement surface that comes into contact with a side of the object being weighed during use or the levelling device is adjustable towards and away from a side wall of the container attached to the apparatus.

16. An apparatus for determining a weight of an object, the apparatus comprising a bracket having a connector for connecting the bracket to the object, the bracket including opposed side surfaces having a plurality of aligned holes formed therein, the apparatus further comprising a housing having opposed side surfaces, the opposed side surfaces having a plurality of aligned holes formed therein, the housing resting on a base, wherein the housing is connected to the bracket by use of one or more pins or other connectors such that when the bracket is connected to the object and the housing is connected to the bracket the object is supported in a raised position and the weight of the object connected to the bracket passes through the housing and through the base, and the apparatus further comprising a weighing sensor for determining a load applied by the object when the object has been lifted or supported, wherein the apparatus is arranged such that when the object is lifted or supported an essentially unidirectional force is applied to the weighing sensor, or such that essentially all of the load applied by the object is transmitted through the weighing sensor, or such that when the object is lifted or supported an essentially unidirectional force is applied to the weighing sensor and such that essentially all of the load applied by the object is transmitted through the weighing sensor, wherein the weighing sensor comprises a load cell, and wherein the load cell has an upper end and a lower end, and the apparatus further comprises a load guide receiving the lower end of the load cell, the load guide passing through an opening in a guide block, an outer side wall of the load guide including one or more bearing races, the opening including bearing races, a plurality of ball bearings being located between the bearing races of the load guide and the opening, the lower end of the load guide being be received in a foot, the ball bearings allowing side loads to be absorbed and not transmitted to the load cell whilst also allowing vertical forces only to be transmitted to the load cell.

17. An apparatus as claimed in claim 16 wherein a pre-load is applied to the load cell.

18. An apparatus for determining a weight of an object, the apparatus comprising a bracket having a connector for connecting the bracket to the object, the bracket including opposed side surfaces having a plurality of aligned holes formed therein, the apparatus further comprising a housing having opposed side surfaces, the opposed side surfaces having a plurality of aligned holes formed therein, the housing resting on a base, wherein the housing is connected to the bracket by use of one or more pins or other connectors such that when the bracket is connected to the object and the housing is connected to the bracket the object is supported in a raised position and the weight of the object connected to the bracket passes through the housing and through the base, and the apparatus further comprising a weighing sensor for determining a load applied by the object when the object has been lifted or supported, wherein the apparatus is arranged such that when the object is lifted or supported an essentially unidirectional force is applied to the weighing sensor, or such that essentially all of the load applied by the object is transmitted through the weighing sensor, or such that when the object is lifted or supported an essentially unidirectional force is applied to the weighing sensor and such that essentially all of the load applied by the object is transmitted through the weighing sensor, wherein the apparatus further comprises a signal transmitter for sending a signal indicative of a weight determined by the weighing sensor to a weight calculator, the weight calculator determining a total weight of the load from the signals received from each of a plurality of apparatus.

19. An apparatus for determining a weight of an object, the apparatus comprising a bracket having a connector for connecting the bracket to the object, the bracket including opposed side surfaces having a plurality of aligned holes formed therein, the apparatus further comprising a housing having opposed side surfaces, the opposed side surfaces having a plurality of aligned holes formed therein, the housing resting on a base, wherein the housing is connected to the bracket by use of one or more pins or other connectors such that when the bracket is connected to the object and the housing is connected to the bracket the object is supported in a raised position and the weight of the object connected to the bracket passes through the housing and through the base, and the apparatus further comprising a weighing sensor for determining a load applied by the object when the object has been lifted or supported, wherein the apparatus is arranged such that when the object is lifted or supported an essentially unidirectional force is applied to the weighing sensor, or such that essentially all of the load applied by the object is transmitted through the weighing sensor, or such that when the object is lifted or supported an essentially unidirectional force is applied to the weighing sensor and such that essentially all of the load applied by the object is transmitted through the weighing sensor, wherein the housing is provided with a levelling device to enable the housing to be levelled, and wherein the levelling device comprises a levelling screw that can be turned to engage with the object to thereby enable the apparatus to be levelled, or a hydraulic jack to provide a required force to hold the housing in the correct position relative to the object to ensure only force in the direction of gravity is measured, or the levelling device is provided with an engagement surface that comes into contact with a side of the object being weighed during use or the levelling device is adjustable towards and away from a side wall of the container attached to the apparatus.

* * * * *